(12) United States Patent
Lablans

(10) Patent No.: US 7,487,194 B2
(45) Date of Patent: Feb. 3, 2009

(54) BINARY AND N-VALUED LFSR AND LFCSR BASED SCRAMBLERS, DESCRAMBLERS, SEQUENCE GENERATORS AND DETECTORS IN GALOIS CONFIGURATION

(76) Inventor: Peter Lablans, 8 Harvey Ct., Morris Township, NJ (US) 07960

( * ) Notice: Subject to any disclaimer, the term of this patent is extended or adjusted under 35 U.S.C. 154(b) by 7 days.

(21) Appl. No.: 11/696,261

(22) Filed: Apr. 4, 2007

(65) Prior Publication Data

US 2007/0239812 A1 Oct. 11, 2007

Related U.S. Application Data

(60) Provisional application No. 60/789,613, filed on Apr. 5, 2006.

(51) Int. Cl.
G06F 15/00 (2006.01)
(52) U.S. Cl. .................................................. 708/492
(58) Field of Classification Search ......... 708/200–209, 708/491–492
See application file for complete search history.

(56) References Cited

U.S. PATENT DOCUMENTS

| | | | |
|---|---|---|---|
| 4,304,962 A | 12/1981 | Fracassi et al. | |
| 4,663,501 A | 5/1987 | Pospischil | |
| 4,669,118 A * | 5/1987 | Pospischil | 380/43 |
| 5,844,989 A * | 12/1998 | Nishida et al. | 380/28 |
| 5,966,447 A * | 10/1999 | Nishida et al. | 380/28 |
| 6,038,577 A * | 3/2000 | Burshtein | 708/252 |
| 6,122,376 A * | 9/2000 | Rao | 380/33 |
| 6,282,230 B1 | 8/2001 | Brown et al. | |
| 6,295,301 B1 | 9/2001 | Asano | |
| 6,665,692 B1 | 12/2003 | Nieminen | |
| 6,788,668 B1 * | 9/2004 | Shah et al. | 370/342 |
| 6,933,862 B2 | 8/2005 | Neff | |
| 6,947,468 B2 | 9/2005 | Medlock | |
| 2003/0063677 A1 | 4/2003 | Mix et al. | |
| 2004/0090907 A1 * | 5/2004 | An | 370/208 |
| 2007/0047623 A1 | 3/2007 | Eun et al. | |
| 2007/0168406 A1 * | 7/2007 | Meyer | 708/252 |

OTHER PUBLICATIONS

Steven A. Tretter, Communication System Design Using DSP Algorithms—Chapter 9 Pseudo-Random Binary Sequences and Data Scramblers, 1995, Springer, pp. 163-171.*
Seok et al., Synchronization of Shift Register Generators in Distributed Sample Scramblers, 1994, IEEE transactions on Communications, vol. 42, No. 2/3/4, pp. 1400-1408.*
Srini et al., A Parallel SONET Scrambler/Descrambler Architecture, 1993, IEEE, pp. 2011-2014.*
Steven S. Gorshe, CRC-16 Polynomials Optimized for Applications Using Self-Synchronous Scramblers, 2002, IEEE, pp. 2791-2795.*
Benjamin Arazi, Self Synchronizing Digital Scramblers, Dec. 1977, IEEE trascations on communications, vol. com-25, No. 12, pp. 1505-1507.*
Sklar, Bernard "Reed-Solomon Codes", Downloaded from URL http://www.facweb.iitkgp.ernet.in/~pallab/mob_com/art_sklar7_reed-solomon.pdf. (unknown), pp. 1-33.

* cited by examiner

Primary Examiner—Chat C Do
(74) Attorney, Agent, or Firm—Diehl Servilla LLC; Glen M. Diehl

(57) ABSTRACT

N-valued with $n \geq 2$ scramblers, descramblers, sequence generators and sequence detectors operate with Linear Feedback Shift Registers (LFSRs) in Galois configuration. Detectors and descramblers in Fibonacci configuration relate to generators and scramblers with LFSRs in Galois configuration. The content of a shift register in a sequence detector in Galois configuration is calculated. Binary and n-valued scramblers in Galois configuration are matched with corresponding self-synchronizing descramblers with Linear Forward Connected Shift Registers. Systems, including communication systems apply scramblers and descramblers, sequence generators and sequence detectors in Galois configuration.

21 Claims, 24 Drawing Sheets

| shift register | | |
|---|---|---|
| sr1 | sr2 | sr3 |
| 1 | 3 | 0 |
| 0 | 1 | 3 |
| 1 | 3 | 2 |
| 3 | 3 | 1 |
| 2 | 2 | 2 |
| 3 | 0 | 0 |
| 0 | 3 | 0 |
| 0 | 0 | 3 |
| 1 | 3 | 3 |
| 1 | 2 | 0 |
| 0 | 1 | 2 |
| 3 | 2 | 3 |
| 1 | 0 | 1 |
| 2 | 0 | 1 |
| 2 | 3 | 1 |
| 2 | 3 | 2 |

| shift register | | |
|---|---|---|
| sr1 | sr2 | sr3 |
| 1 | 3 | 2 |
| 3 | 3 | 1 |
| 2 | 2 | 2 |
| 3 | 0 | 0 |
| 0 | 3 | 0 |
| 0 | 0 | 3 |
| 1 | 3 | 3 |
| 1 | 2 | 0 |
| 0 | 1 | 2 |
| 3 | 2 | 3 |
| 1 | 0 | 1 |
| 2 | 0 | 1 |
| 2 | 3 | 1 |
| 2 | 3 | 2 |
| 3 | 0 | 1 |
| 2 | 2 | 1 |

| shift register | | |
|---|---|---|
| sr1 | sr2 | sr3 |
| 0 | 1 | 0 |
| 0 | 0 | 1 |
| 1 | 1 | 1 |
| 3 | 0 | 0 |
| 1 | 3 | 0 |
| 2 | 1 | 3 |
| 0 | 1 | 2 |
| 2 | 2 | 3 |
| 0 | 1 | 1 |
| 1 | 1 | 0 |
| 2 | 1 | 1 |
| 2 | 3 | 0 |
| 3 | 2 | 3 |
| 2 | 0 | 1 |
| 2 | 3 | 1 |
| 2 | 3 | 2 |

| shift register | | | | |
|---|---|---|---|---|
| sr1 | sr2 | sr3 | sr4 | sr5 |
| 0 | 1 | 0 | 0 | 1 |
| 1 | 0 | 1 | 1 | 0 |
| 0 | 1 | 0 | 1 | 1 |
| 1 | 0 | 1 | 1 | 1 |
| 1 | 1 | 0 | 0 | 1 |
| 1 | 1 | 1 | 1 | 0 |
| 0 | 1 | 1 | 1 | 1 |
| 1 | 0 | 1 | 0 | 1 |
| 1 | 1 | 0 | 0 | 0 |
| 0 | 1 | 1 | 0 | 0 |
| 0 | 0 | 1 | 1 | 0 |
| 0 | 0 | 0 | 1 | 1 |
| 1 | 0 | 0 | 1 | 1 |
| 1 | 1 | 0 | 1 | 1 |
| 1 | 1 | 1 | 1 | 1 |
| 1 | 1 | 1 | 0 | 1 |

| shift register | | | | |
|---|---|---|---|---|
| sr1 | sr2 | sr3 | sr4 | sr5 |
| 1 | 1 | 1 | 1 | 1 |
| 1 | 1 | 1 | 0 | 1 |
| 0 | 1 | 1 | 0 | 0 |
| 1 | 0 | 1 | 1 | 0 |
| 1 | 1 | 0 | 1 | 1 |
| 0 | 1 | 1 | 1 | 1 |
| 0 | 0 | 1 | 0 | 1 |
| 1 | 0 | 0 | 0 | 0 |
| 1 | 1 | 0 | 0 | 0 |
| 1 | 1 | 1 | 0 | 0 |
| 0 | 1 | 1 | 1 | 0 |
| 0 | 0 | 1 | 1 | 1 |
| 0 | 0 | 0 | 0 | 1 |
| 0 | 0 | 0 | 1 | 0 |
| 1 | 0 | 0 | 0 | 1 |
| 1 | 1 | 0 | 1 | 0 |

BINARY AND N-VALUED LFSR AND LFCSR BASED SCRAMBLERS, DESCRAMBLERS, SEQUENCE GENERATORS AND DETECTORS IN GALOIS CONFIGURATION

CROSS-REFERENCE TO RELATED APPLICATIONS

This application claims the benefit of U.S. Provisional Application No. 60/789,613, filed Apr. 5, 2006, which is incorporated herein by reference in its entirety.

BACKGROUND OF THE INVENTION

The present invention relates to n-valued Linear Feedback Shift Registers (LFSRs). More specifically it relates to equivalency of n-valued LFSRs in Fibonacci and Galois configuration.

Data scramblers, descramblers, sequence generators, detectors and coders based on shift registers with feedback are important components in data communications and data transfer in applications such as magnetic and optical data storage. It is known that linear feedback shift registers (LFSRs) can be realized in Fibonacci and Galois configurations. LFSRs in Fibonacci configuration are easier to analyze. Descramblers in Fibonacci are self-synchronizing. No prior art was found with sequence descramblers in a first Galois configuration. However descramblers in a first Galois configuration herein provided as an aspect of the present invention are not self-synchronizing. LFSRs in Galois configuration require fewer clock cycles for execution than Fibonacci equivalents.

LFSRs are also of interest in n-valued applications with n>2. It is sometimes advantageous to design an LFSR in Fibonacci configuration, while implementing it in Galois configuration. It may also be advantageous to implement an n-valued sequence generator in Galois configuration, because it is fast. One may want also to create a matching self synchronizing detector for such a generator, which may be in Fibonacci configuration. The rules for creating corresponding n-valued Fibonacci equivalent LFSRs in descramblers to Galois scramblers were not known prior to the present invention.

Accordingly methods for designing corresponding Galois and Fibonacci LFSRs and self-synchronizing descramblers in Galois configuration are required and apparatus implementing corresponding Galois and Fibonacci devices are required.

SUMMARY OF THE INVENTION

In the context of the present invention the term n-valued is used. In general n is intended to indicate a state of a signal or a symbol with n>2, unless it is specifically mentioned that $n \geq 2$. Symbols may represent a signal. The term symbol and signal may be used interchangeably. An n-valued symbol or signal is able to assume one state at a time, wherein the symbol or signal assumes one of n possible states. In general states are indicated with values from 0 to (n−1). A state signifies only that it is different from another state. While a state of a symbol may represent a signal, a state does not reflect the actual value of a signal. An exception herein may be the state 0, which in certain cases may reflect absence of signal. A symbol which is indicated as being able to assume one of n states, is intended to be able assume at a time any of the n possible states. In some cases a symbol may be able to only or at least assume a limited number of states. In that case it may be mentioned that a symbol can assume for instance a first or a second state.

LFSRs are widely used for coding and decoding. Scramblers and descramblers differ from some coders that they are first of all generally streaming, coding one received symbol into another symbol and no symbols are added or removed. This is different from for instance Reed-Solomon coders, which use LFSRs. However those coders work on a predetermined number of symbols and form a codeword or decode a codeword of finite length. Also for each codeword the initial content of the shift register is reset. This is usually different for scramblers and descramblers.

In accordance with one aspect of the present invention presents a novel method and system that implement binary and n-valued with n>2 sequence generators, scramblers, descramblers and detectors in LFSRs and Linear Forward Connected Shift Registers (LFSCRs) in fast Galois configuration.

In accordance with another aspect of the present invention binary and n-valued corresponding scramblers and descramblers in Galois configuration are provided.

In accordance with a further aspect of the present invention binary and n-valued scramblers, descramblers, detectors and generators are provided which apply multi-input switching functions.

In accordance with another aspect of the present invention methods are provided for determining equivalent LFSRs in Galois and Fibonacci configuration.

In accordance with a further aspect of the present invention a method is provided to determine the content of a shift register in Galois configuration.

In accordance with another aspect of the present invention methods, apparatus and a system are provided for detecting a maximum length sequence of binary or n-valued symbols by using LFSRs in Galois configuration.

In accordance with a further aspect of the present invention self synchronizing binary and n-valued descramblers in Galois configuration using a LFSCR are provided.

In accordance with another aspect of the present invention self synchronizing binary and n-valued descramblers in Galois configuration using a LFSCR and corresponding to scramblers with a Galois LFSR and one or more inverters are provided.

In accordance with a further aspect scramblers, descramblers, sequence generators, and detectors with inverters being equivalent to the same without inverters are provided.

In accordance with a further aspect of the present invention systems including communication and data storage systems are provided.

DETAILED DESCRIPTION OF THE INVENTION

Standard binary LFSR based scramblers, descramblers and sequence generators are generally provided in Fibonacci form. The inventor has shown elsewhere, such as in United States Non-Provisional patent application Ser. No. 10/935,960 filed on Sep. 8, 2004 entitled: Ternary and multi-value digital signal scramblers, descramblers and sequence generators, which is incorporated hereby in its entirety by reference, how non-binary scramblers, descramblers and sequence generators can be created in Fibonacci form.

Figure 1:
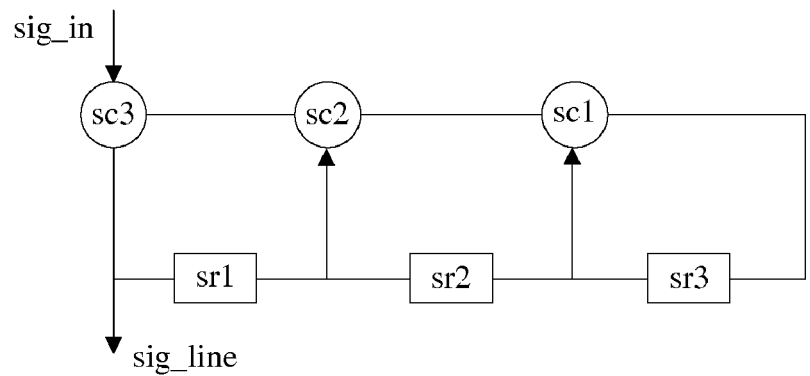
FIG. 1 is a diagram of an n-valued scrambler in Fibonacci configuration.

FIG. 1 shows in diagram an illustrative n-valued LFSR based scrambler. The shift register is comprised of 3 elements [SR1 SR2 SR3] and there are 3 taps. The n-valued feedback logic functions are sc1 and sc2. The functions sc1, sc2 and sc3 are n-valued 2 inputs/single output n-valued reversible logic functions. The n-valued function sc3 combines an incoming signal 'sig_in' with a signal that was fed back by the LFSR. The output of the circuit is 'sig_line'. One can create many different scramblers based on LFSRs with any p-length shift register applying one or p feedback taps and any of the possible n-valued reversible logic functions.

The scrambled signal 'sig_line' can be de-scrambled by the corresponding n-valued LFSR based descrambler. The descrambler is shown in diagram in FIG. 2.

The descrambler is almost a perfect reverse or mirror image of the scrambler around the x-axis, with sc3 becoming ds3 and with an input and output of function sc3 changing position. The rule for the descrambler is that it has an identical number of elements of shift registers, identical number of taps and position of taps. Also the feedback taps are connected to identical reversible n-valued functions as in the scrambler. The only difference is that instead of a reversible n-valued function 'sc3' the descrambler has an n-valued function 'ds3'. The function 'ds3' is the reverse of 'sc3'. So if c=(a sc3 b) then a=(c ds3 b).

Both the scrambler and descrambler work under the control of a clock signal upon which the content of the shift register elements moves one position. The clock signal is assumed but not drawn in the diagrams.

The advantage of the above descrambler is that it is self synchronizing with regard to the content of its shift register. In case of an error in the incoming signal the error will not be propagated, but will be flushed after the error has been shifted out of the shift register. This means that an error will not propagate beyond the length of the shift register.

One can also create a scrambler and descrambler in Galois configuration. In that case the logic function in the tap connects directly two adjacent shift register elements. A scrambler in Galois configuration is shown in a diagram in FIG. 3. Its corresponding descrambler is shown in diagram in FIG. 4.

The advantage of the Galois configuration is that the delay in determining all the signals can be less than in the Fibonacci configuration. One can see for instance in the diagram of FIG. 1 that in the Fibonacci configuration one has to generate intermediate results from function sc1, then from sc2 before one can generate the scrambling result. This can be substantially longer than in the Galois configuration.

While Galois configurations are known, they are usually designed as for instance Galois Field multipliers or dividers. This requires in many cases that the taps have a multiplication function over GF(n) and that the functions sc1 and sc2 for instance are adders over GF(n). The inventor has shown in the cited patent application Ser. No. 10/935,960 that one can combine an n-valued logic function with an inverter in one or both inputs into a single n-valued logic function. The inventor has also shown in U.S. patent application Ser. No. 11/679,316 filed on February 27, entitled METHODS AND APPARATUS IN FINITE FIELD POLYNOMIAL IMPLEMENTATIONS which is incorporated hereby in its entirety by reference, how Galois type scrambling and descrambling solutions can be created that apply no multipliers in their taps.

Figure 2:
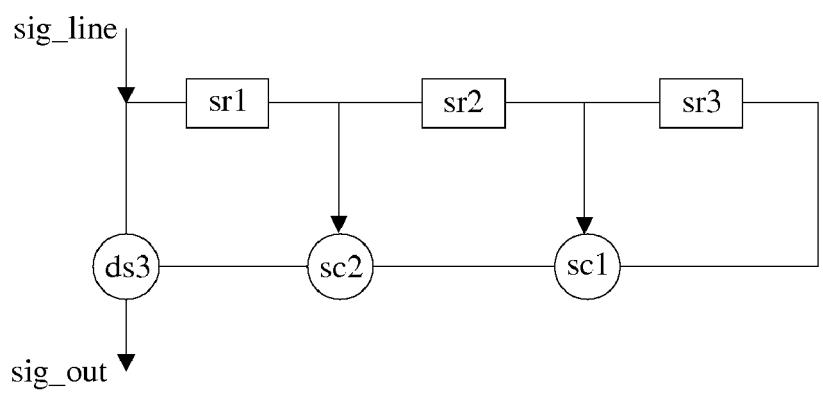
FIG. 2 is a diagram of an n-valued descrambler in Fibonacci configuration.
Figure 3:
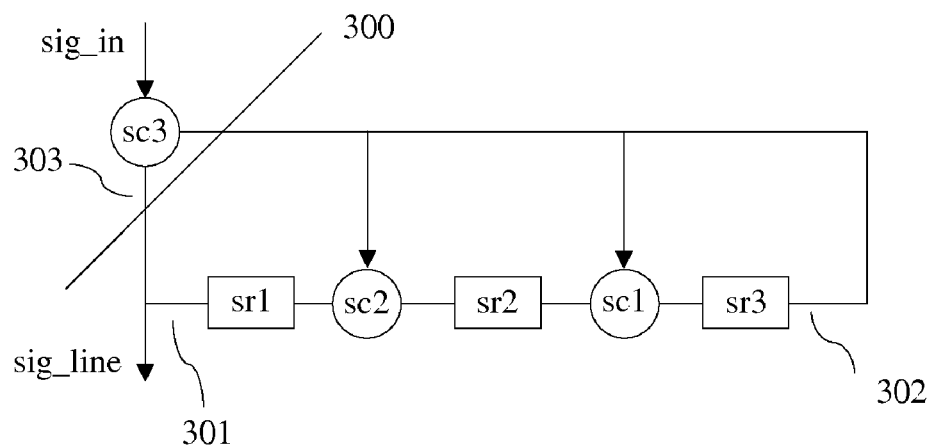
FIG. 3 is a diagram of an n-valued scrambler in Galois configuration.

While the scrambler of FIG. 1 and FIG. 3 look similar, with just the functions in different places, their results in scrambling usually are different, even when the initial state of the shift registers of FIG. 1 and FIG. 3 are identical. The descrambler of FIG. 4 descrambles correctly the sequence generated by the scrambler of FIG. 3. Accordingly the descramblers of FIG. 2 and FIG. 4 will in general be different. The descrambler of FIG. 4 unfortunately is not self synchronizing as the shift register will not be flushed over time. An error in the received signal will thus be perpetuated.

If one expects errors during transmission or processing of the scrambled signals one should use a self-synchronizing descrambler. One may reduce the delay time of descramblers in Fibonacci configuration by using multi-input adders over GF(n). It was shown in the cited patent application Ser. No. 11/679,316 that one can create a multi-input adder with multipliers over GF(n) at the inputs from a limited set of n-valued inverters and n-valued switches which are in series and can be switched simultaneously.

Figure 5:
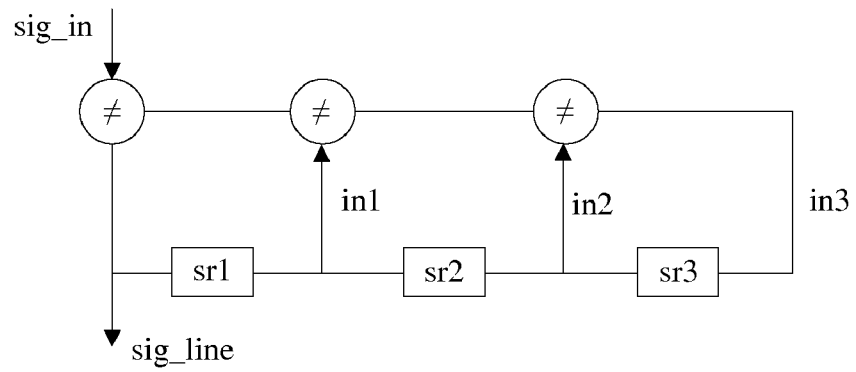
FIG. 5 is a diagram of a binary scrambler in Fibonacci configuration.
Figure 6:
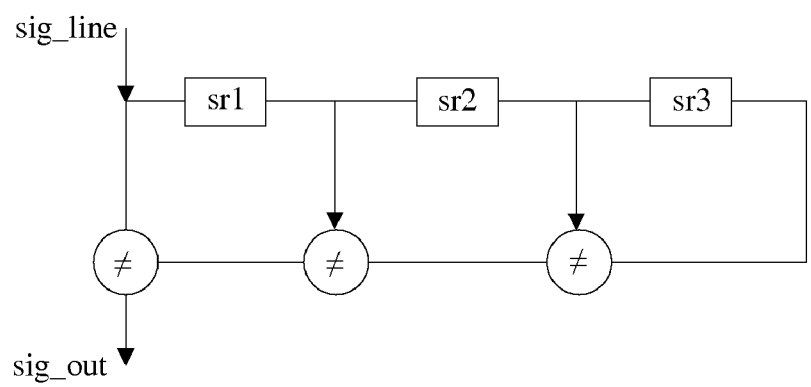
FIG. 6 is a diagram of a binary descrambler in Fibonacci configuration.
Figure 7:
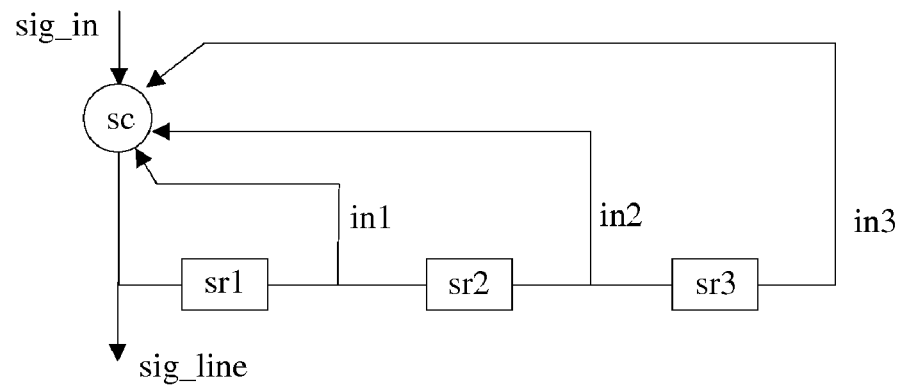
FIG. 7 is a diagram of a scrambler with a multi-input function.
Figure 8:
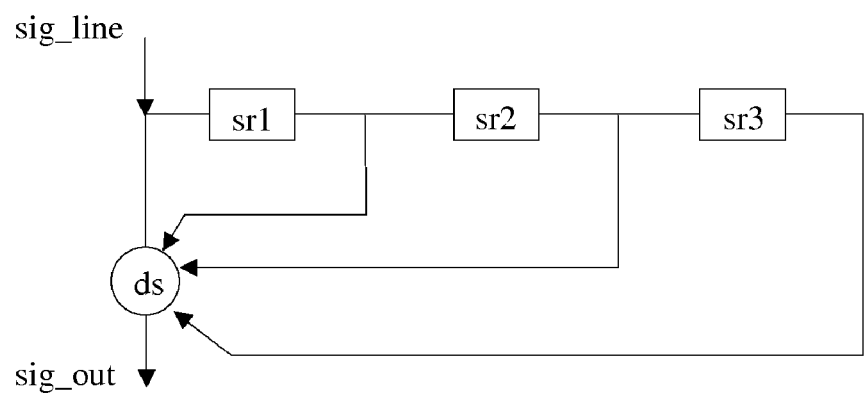
FIG. 8 is a diagram of a descrambler with a multi-input function.

The diagram of FIG. 5 and FIG. 6 show a known binary scrambler and descrambler. FIG. 7 and FIG. 8 show how the individual XOR function may be combined into a single multi-input function sc with a truth table of sub tables and into a single multi-input function ds for the descrambler. It is believed to be a novel approach to implement sc and ds with inverters and switches.

It may be difficult to visualize the truth table of sc and ds. The truth table is in fact an array sc(sig_in, in1, in2, in3). One may show sc along different dimensions. Because in general an n-valued truth table is shown as a 2-dimensional matrix, the truth table will be shown as a series of two dimensional sub-tables in the following tables:

| (0, 0) | 0 | 1 | (1, 0) | 0 | 1 | (0, 1) | 0 | 1 | (1, 1) | 0 | 1 |
|---|---|---|---|---|---|---|---|---|---|---|---|
| 0 | 0 | 1 | | 1 | 0 | | 1 | 0 | | 0 | 1 |
| 1 | 1 | 0 | | 0 | 1 | | 0 | 1 | | 1 | 0 |

Figure 9:
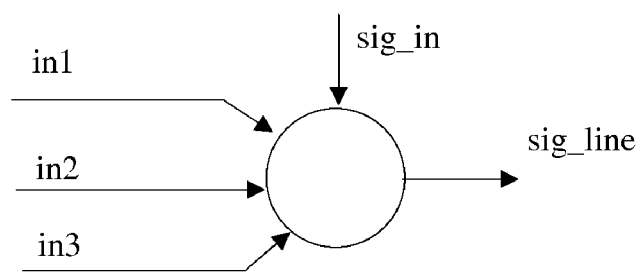
FIG. 9 is a diagram of a multi-input switching function in accordance with an aspect of the present invention.

This truth table implements the multi-input binary logic function of FIG. 9.

Figure 10:
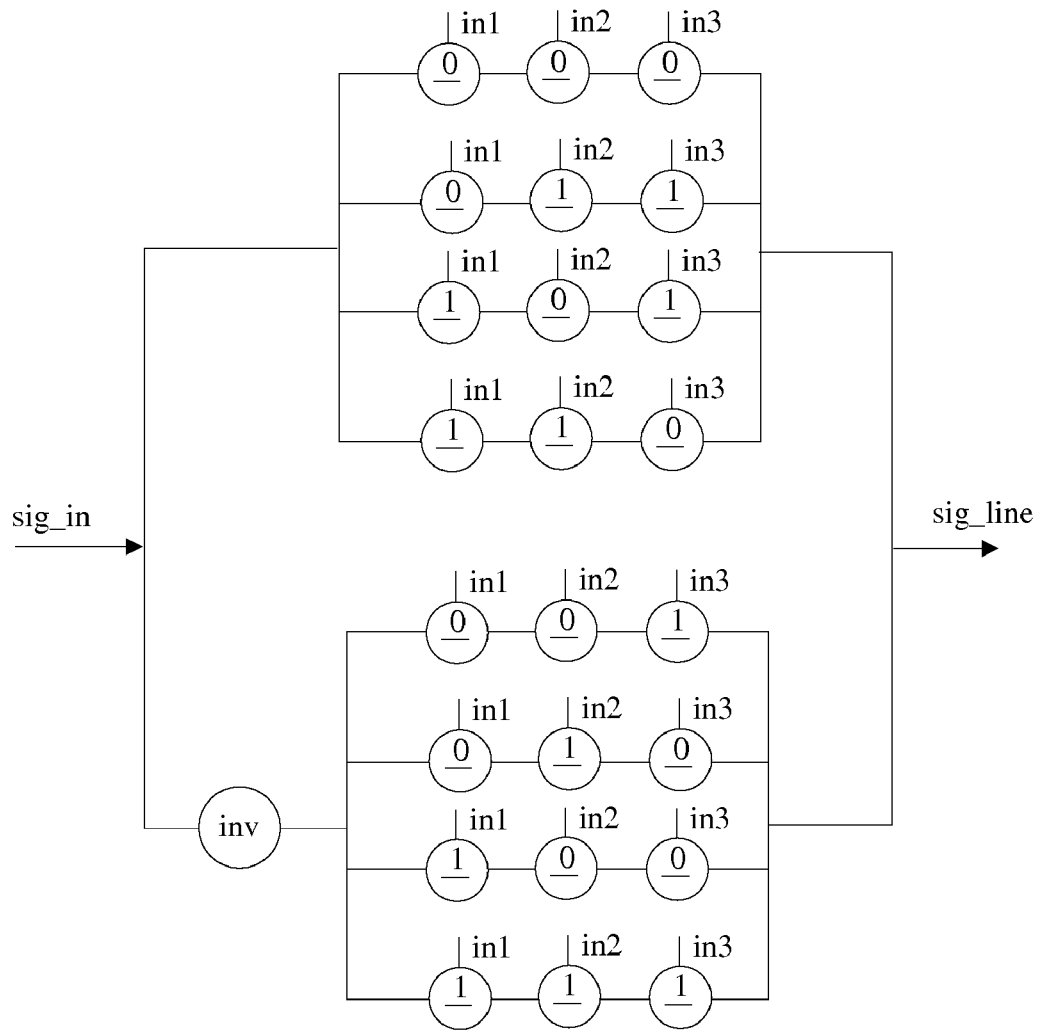
FIG. 10 is an implementation of a multi-input function in accordance with an aspect of the present invention.

An implementation of the function sc of FIG. 9 by way of individually controlled gates and inverters is shown in FIG. 10. The inventor has shown in U.S. patent application Ser. No. 11/000,218 filed on Nov. 30, 2004 entitled SINGLE AND COMPOSITE BINARY AND MULTI-VALUED LOGIC FUNCTIONS FROM GATES AND INVERTERS, which is incorporated herein by reference in its entirety, how one can realize any truth table from individually controlled switches and inverters, including binary and non-binary truth tables. The approach herein is that a row or a column is implemented by an inverter. One way to visualize such an implementation is to assume that the signals are optical in nature able to assume 2 or more states and are passed by a switch or are blocked. Herein absence of signal is also a state.

A column or row [0 1] in the truth table of sc is identity or a plain conductor. A column or row [1 0] is an inverter 'inv'. Assume that [0 1] and [1 0] are 'seen' by signal 'sig_in' depending on a state of 'in1', 'in2' and 'in3'. Accordingly the implementation only requires one conductor and one inverter and a number of gates activated by signals 'in1', 'in2' and 'in3' acting upon 'sig_in' to generate the correct state of 'sig_line'. The truth table of FIG. 9 can then be realized by an implementation as shown in FIG. 10. Because all gates switch simultaneously there should be minimal delay.

The same approach can be applied to a non-binary adder used in a scrambler or descrambler. One can start out designing such a multi-input scrambler configuration with the configuration in FIG. 3 wherein all functions are n-valued. Herein the functions sc3 is assumed to be an adder over GF(4) for simplicity reasons. However if sc3 is not an adder one may expand sc3 into an adder with inverters at the input. The functions sc2 and sc1 are also expanded into adders and multipliers over GF(4).

Figure 11:
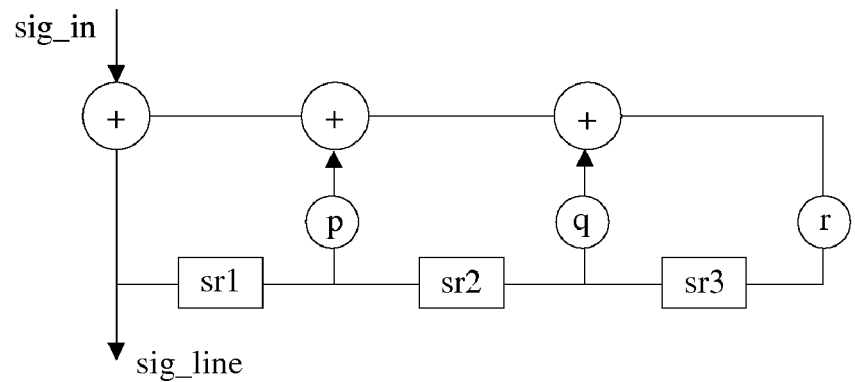
FIG. 11 is a diagram of a scrambler in Fibonacci configuration.
Figure 12:
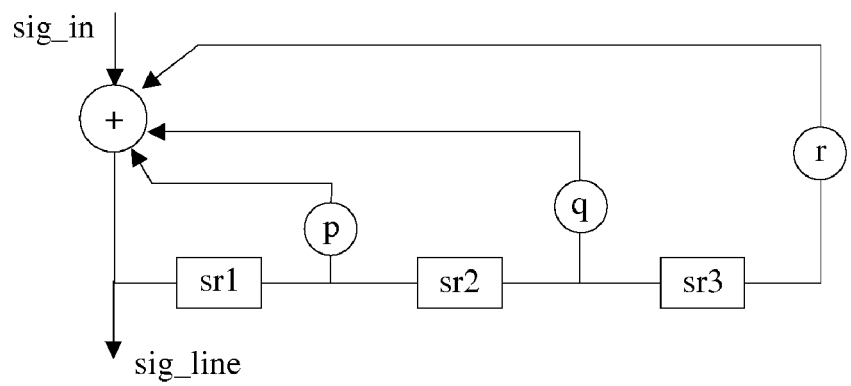
FIG. 12 is another diagram of a scrambler in Fibonacci configuration.
Figure 13:
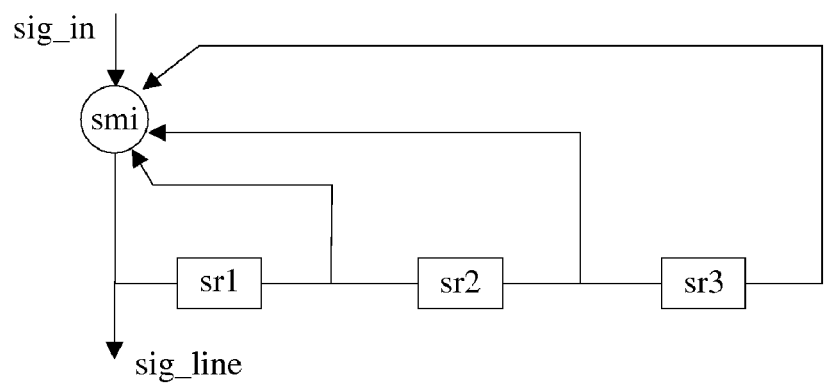
FIG. 13 is yet another diagram of a scrambler in Fibonacci configuration.

Assume to start out with the 4-valued scrambler of FIG. 11. Because the adder is associative one can reduce the configuration to the implementation as shown in FIG. 12. And in a next step one can reduce the multi-input 4-valued adder over GF(4) with multipliers at the input to the configuration of FIG. 13 having no multipliers and a 4-valued multi-input function 'smi'.

Figure 14:
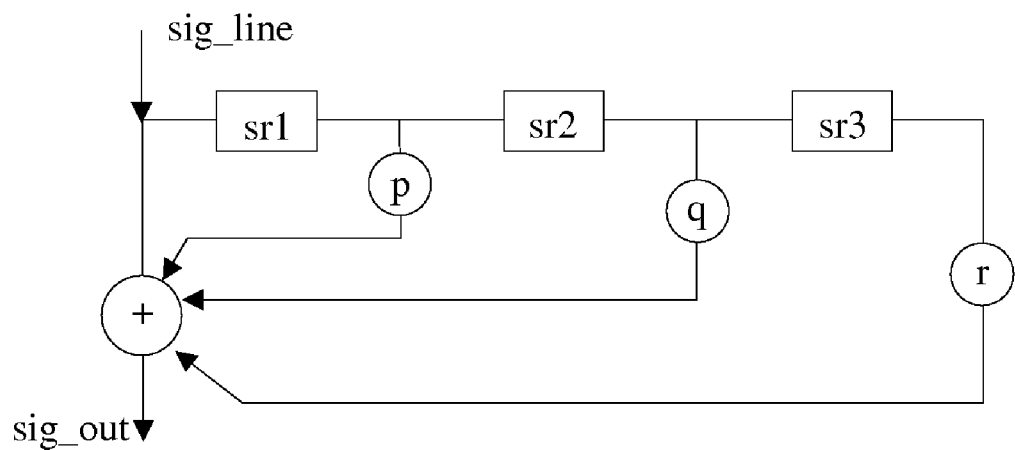
FIG. 14 is a diagram of a descrambler in Fibonacci configuration.

One may use this approach also for the descrambler. Accordingly an n-valued descrambler in Fibonacci configuration as shown in FIG. 14 with an adder over GF(4) in the present example and with multipliers p, q, and r over GF(4) can be reduced to a descrambler with a single multi-input function 'dmi' as shown in FIG. 15.

In a next section the rules for creating matching sets of n-valued scramblers in Galois configuration with n-valued descramblers in Fibonacci configuration will be provided. This allows one to create a fast scrambler with a matching descrambler. The here provided method of implementing multi-input n-valued functions also allows to create fast Fibonacci descramblers, which are self-synchronizing.

Figure 15:
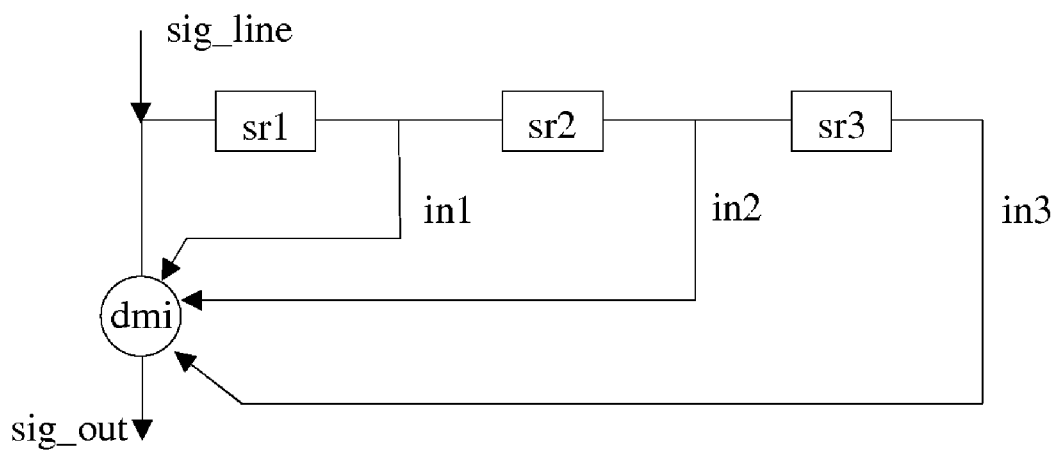
FIG. 15 is another diagram of a descrambler in Fibonacci configuration.
Figure 16:
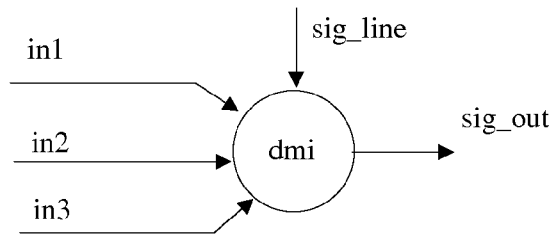
FIG. 16 is a diagram of a multi-input switching function.

Using the descrambler of FIG. 15 wherein in1 is the signal from shifts register element sr1, in2 is the signal from shifts register element sr2 and in3 is the signal from shifts register element sr3. Further more 'sig_line' is the signal received by the descrambler and 'sig_out' is the signal generated by the descrambler. The multi-input function 'dmi' consolidating the different functions with its inputs and output is shown in FIG. 16.

Assume the multipliers to be p=3, q=2 and r=3 over GF(4) as an illustrative example. A basic 2-input addition and a multiplication truth table over GF(4) are provided in the following tables.

| + | 0 | 1 | 2 | 3 | x | 0 | 1 | 2 | 3 |
|---|---|---|---|---|---|---|---|---|---|
| 0 | 0 | 1 | 2 | 3 | 0 | 0 | 0 | 0 | 0 |
| 1 | 1 | 0 | 3 | 2 | 1 | 0 | 1 | 2 | 3 |
| 2 | 2 | 3 | 0 | 1 | 2 | 0 | 2 | 3 | 1 |
| 3 | 3 | 2 | 1 | 0 | 3 | 0 | 3 | 1 | 2 |

Accordingly a multiplier 2 is the 4-valued inverter [0 2 3 1] and multiplier 3 is the inverter [0 3 1 2]. The truth table of the 4-input 4-valued function has 4×4 or 16 truth sub-tables (with every additional input the number of sub tables is multiplied by n=4 in this case). Each sub table has the same columns (or rows) as in the original addition table which will be modified according to the multipliers. So in this case the 4 columns (or inverters) are [0 1 2 3] which is identity; [1 0 3 2]; [2 3 0 1] and [3 2 1 0]. As in the binary case one can implement the complete truth table of the function 'dsi' by using the 4 inverters, with signal 'sig_line' as input, and enabling the appropriate inverter by a set of individually controlled gates, which are controlled by the signals 'in1', 'in2' and 'in3'. All the signals are available at the same time and each gate can be enabled at the same time.

Sequence Generators in Galois Configuration

It is possible to create multi-valued sequences with feedback shift registers in Galois configuration. An example will first be provided of a ternary PN generator in Galois configuration. The shift register is comprised of 5 elements and a ternary logic function sc1 will be used between element 4 and 5 of the shift register. The truth table of sc1 is provided in the following table.

| sc1 | 0 | 1 | 2 |
|---|---|---|---|
| 0 | 0 | 1 | 2 |
| 1 | 2 | 0 | 1 |
| 2 | 1 | 2 | 0 |

Figure 17:
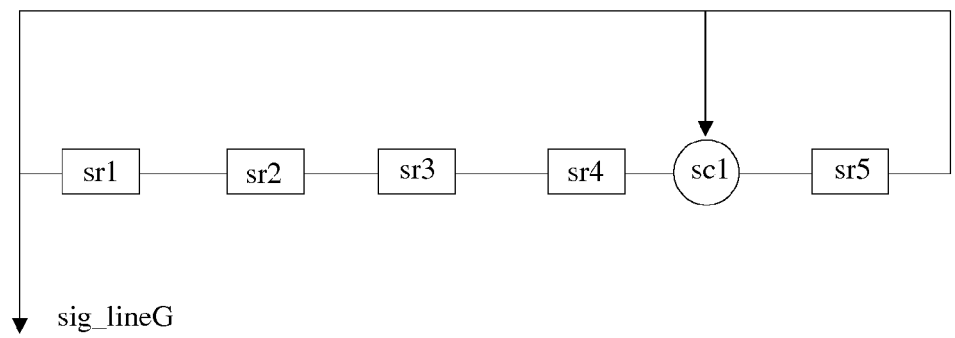
FIG. 17 is a diagram of a sequence generator in Galois configuration.

The initial content of the shift register is [1 0 2 1 0]. The diagram in FIG. 17 provides the used Galois configuration. (As before a clock signal is assumed but not shown). This sequence generator will create a ternary pseudo-random sequence of length 242 symbols and its auto-correlation graph is a bi-level graph with a single peak. The top input of sc1 determines the column and the input to sc1 from shift register element sr4 determines the row of the truth table.

Figure 19:
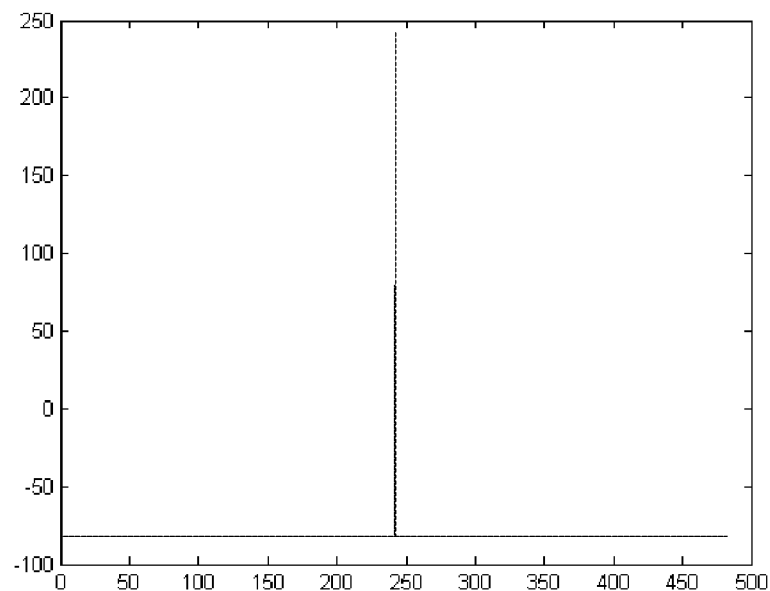
FIG. 19 is a correlation graph.

FIG. 19 shows an auto-correlation graph of the sequence generated by this configuration.

Figure 18:
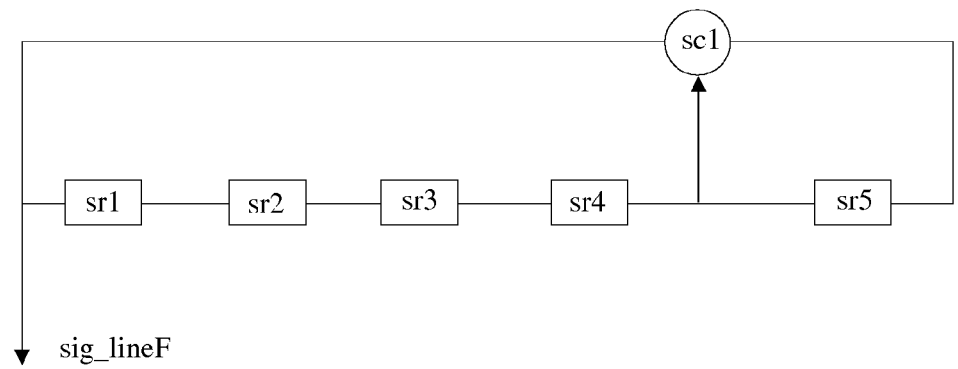
FIG. 18 is a diagram of a sequence generator in Fibonacci configuration.
Figure 20:
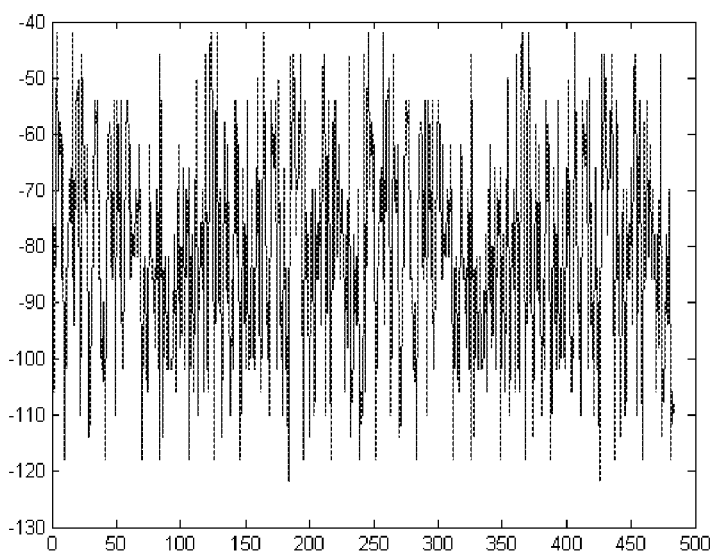
FIG. 20 is a cross-correlation graph.

One can also create a sequence generator in Fibonacci configuration from these components and the same ternary logic function. This is shown in the diagram of FIG. 18. This configuration will also generate a ternary PN-sequence of length 242. Also the order of the inputs to the function sc1 is switched. The generated sequence here is different from the sequence generated in the Galois configuration. The graph in FIG. 19 shows an auto-correlation of the sequence generated by the Galois configuration and by the Fibonacci configuration. FIG. 20 shows a cross-correlation graph of the two sequences generated by the generators of FIG. 17 and FIG. 18 which demonstrates that the two sequences are not shifted versions of each other.

Thus it should be clear that one can use the Galois configuration as a method to create PN sequences. The method also works for other values of n and for configurations with more than 1 tap and different n-valued functions.

Comparing Fibonacci and Galois sequence generators

In this section 4-valued and 3-valued sequence generators in Galois and in Fibonacci configuration will be demonstrated.

Figure 21:
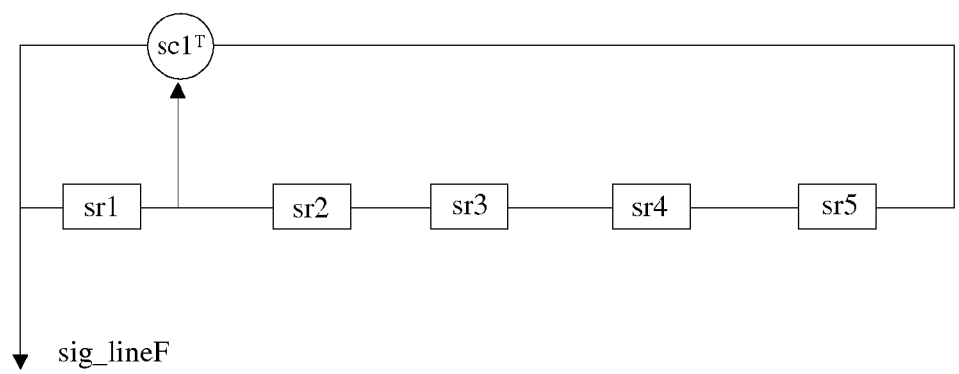
FIG. 21 is a diagram of a sequence generator in Fibonacci configuration in accordance with an aspect of the present invention

As a first example a 3-valued sequence generator in Fibonacci configuration as shown in FIG. 21 will be used. One can see that this generator, like the generator in Galois configuration in FIG. 17 has only one 3-valued function. However instead 3-valued function sc1 at a tap after shift register element sr4 it has a function $sc1^T$ (which is the transposed version of sc1) at the tap after shift register element 1. The truth table of $sc1^T$ is shown in the following table.

| $sc1^T$ | 0 | 1 | 2 |
|---|---|---|---|
| 0 | 0 | 2 | 1 |
| 1 | 1 | 0 | 2 |
| 2 | 2 | 1 | 0 |

Figure 22:
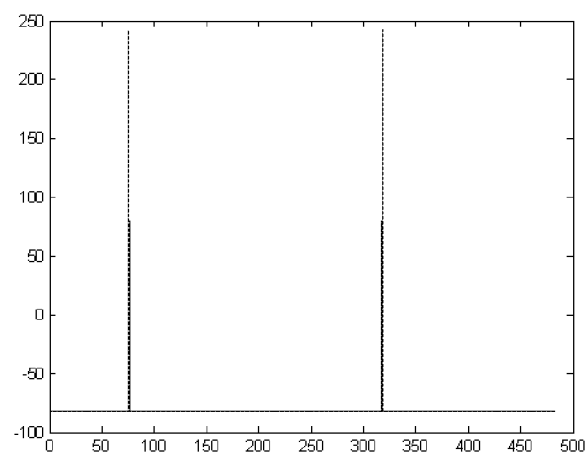
FIG. 22 is a cross-correlation graph.

This generator will generate a maximum length pn sequence. The generator of FIG. 17 will also generate a maximum pn sequence. A cross correlation graph of the pn sequences of 242 symbols generated by each generator using the same initial shift register is shown in FIG. 22. One can see that the graph has two peaks, not centered. This means that the two sequences are shifted maximum length sequences. By using different initial content of the shift register one is able to generate two identical sequences from the Galois and the Fibonacci configuration.

Basically this provides the rule for finding equivalent Fibonacci and Galois configurations for sequence generators. The example shows that one should carefully watch the order of inputs of n-valued functions if a function is non-commutative. Switching a set of inputs will make the configurations non-matching. Another issue to watch carefully is to make sure to select a generator that will generate either a maximum length sequence or sequences that have the same repetitive performance. In most cases, it turns out there will be no matching pairs of configurations. However a maximum length sequence can only repeat over (n^p−1) in an n-valued LFSR with p shift register elements. So each maximum length pn sequence can be generated by a particular generator, be it in Galois or Fibonacci configuration. Further more a Galois configuration cannot create more pn sequences than a Fibonacci configuration with the same number of shift register elements. Consequently there is at least one Galois and Fibonacci configuration for each maximum length sequence.

It is also possible to find matching pairs in Fibonacci and Galois configuration for some (but not all) sequences not being a maximum length sequence. However such pairs do not have to be unique, in the sense that a Galois configuration may have several matching Fibonacci configurations.

Figure 23:
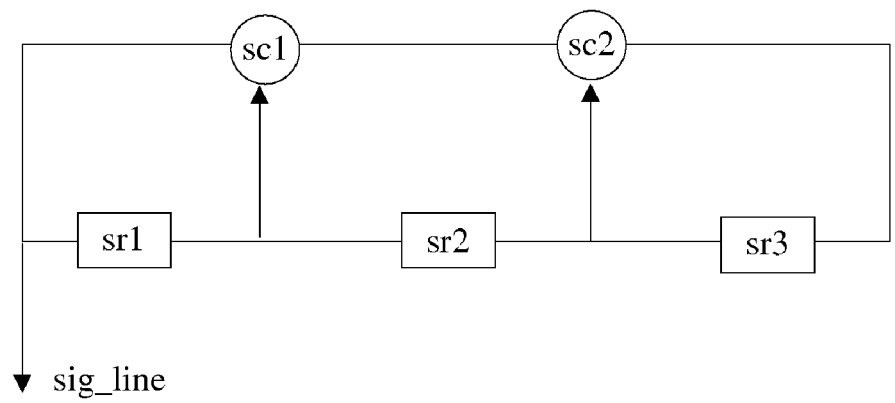
FIG. 23 is a diagram of a sequence generator in Fibonacci configuration.

The diagram of FIG. 23 shows a Fibonacci configuration of an n-valued sequence generator. Assume that the circuit is 4-valued. The truth tables of sc1 and sc2 are provided in the following tables.

| sc1 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| sc2 | 0 | 1 | 2 | 3 |
|---|---|---|---|---|
| 0 | 0 | 2 | 3 | 1 |
| 1 | 1 | 3 | 2 | 0 |
| 2 | 2 | 0 | 1 | 3 |
| 3 | 3 | 1 | 0 | 2 |

Function sc1 is commutative and sc2 is non-commutative. Assume that the initial state of the shift register [sr1 sr2 sr3] is [1 0 3]. This particular sequence generator will generate a maximum length 4-valued pn sequence of 63 symbols seq41.
seq41=[0 1 3 2 3 0 0 1 1 0 3 1 2 2 2 3 2 2 1 0 2 0 2 1 3 1 0 0 2 2 0 1 2 3 3 3 1 3 3 2 0 3 0 3 2 1 2 0 0 3 3 0 2 3 1 1 1 2 1 1 3 0 1].

The diagram in FIG. 23 shows the equivalent 4-valued sequence generator in Galois configuration of the generator in FIG. 22. One should apply 'flipping' or 'mirroring' the taps and functions in the Fibonacci configuration to create the Galois configuration and vice versa. One has also to mirror the position of the taps to complete the equivalent transformation. Assume that there are p shift register elements both in Fibonacci and in the Galois configurations. In order to change the Fibonacci configuration into an equivalent Galois configuration, remembering that this rule in general only applies to maximum length sequence generators, one has to perform the following steps.

1. Determine the position of a tap in the Fibonacci configuration. Assume a tap is in the position k of (p−1) possible positions (this is 1 less than the number of elements, as a tap is always between two elements) wherein k is the number of elements between the tap and the input of the first element.

2. Determine the truth table of the function connected to a tap.

3. Determine the mirror position of the Fibonacci tap in the Galois configuration. This is then k elements from the output of the last tap of the shift register in the Galois configuration.

4. Determine the transposed (columns and rows exchanged so that the first row becomes the first column etc.) versions of the truth tables of the logic functions at the taps and put the transposed functions in their mirror position.

This is a rule that cannot be extrapolated from binary configurations. Clearly the binary case has no non-commutative reversible functions and thus cannot apply this rule.

Application of this rule to the example will then create the following functions and their truth tables.

| $sc2^T$ | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

The function sc2 is commutative. Consequently the function $sc2^T$ will have the same truth table as sc2.

| $sc1^T$ | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

The initial state of the shift register [sr1 sr2 sr3] is [1 0 3]. The Galois sequence generator will create a sequence seq42.
seq42=[3 3 2 0 3 0 3 2 1 2 0 0 3 3 0 2 3 1 1 1 2 1 1 3 0 1 0 1 3 2 3 0 0 1 1 0 3 1 2 2 2 3 2 2 1 0 2 0 2 1 3 1 0 0 2 2 0 1 2 3 3 3 1]. Sequences seq41 and seq42 are shifted versions of each other.

Figure 24:
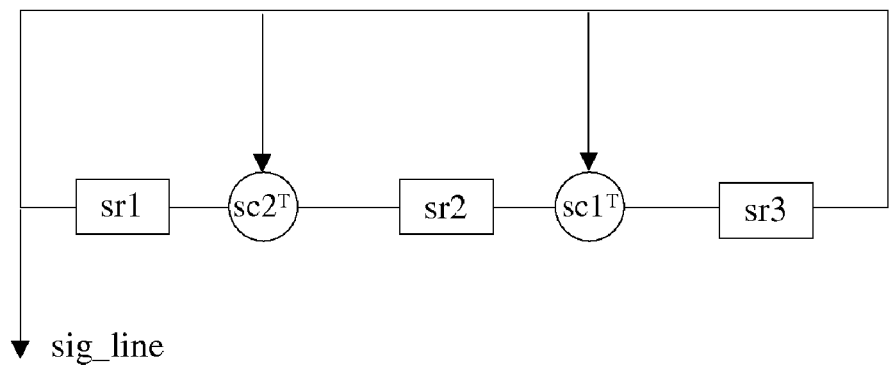
FIG. 24 is a diagram of a sequence generator in Galois configuration in accordance with an aspect of the present invention.

The Galois configuration of FIG. 24 will generate exactly the same sequence as the Fibonacci configuration of FIG. 23 when the initial state of its shift register is [1 1 0]. In order to generate an identical sequence when the conditions of tap positions and functions have been met the initial content of the shift register in the Galois configuration needs to be 1 higher than the one in the Fibonacci configuration in this example. A 3-valued example To show that the transformation from Fibonacci to Galois (or Galois to Fibonacci) works in general, another sequence generator will be in 3-valued example with a shift register of 6 elements and 3 different functions.

Figure 25:
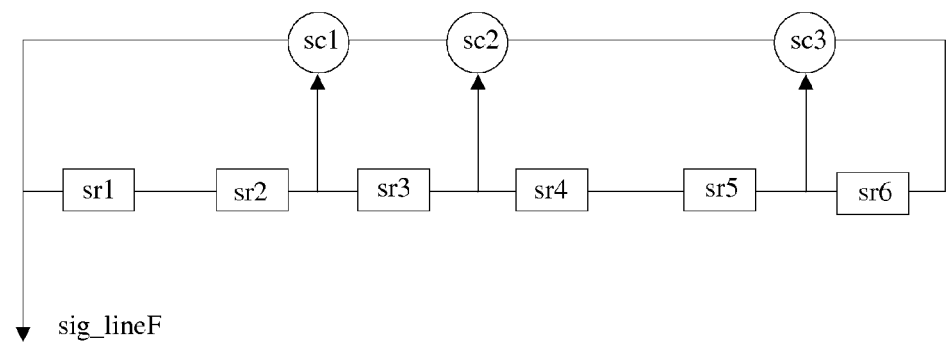
FIG. 25 is a diagram of a sequence generator in Fibonacci configuration.
Figure 26:
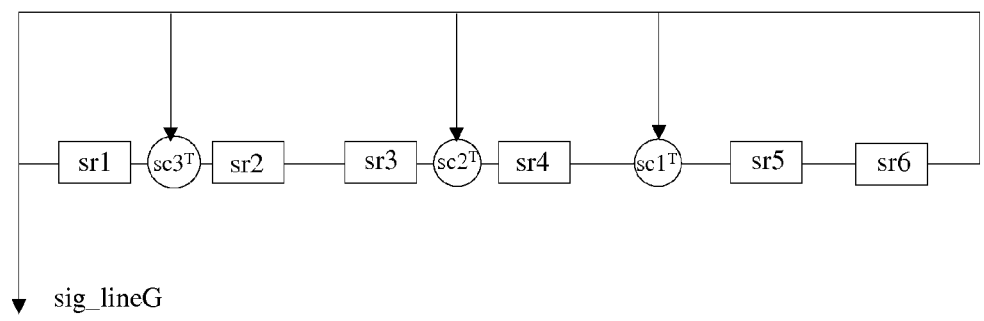
FIG. 26 is a diagram of a sequence generator in Galois configuration in accordance with an aspect of the present invention.

The example will start with the Fibonacci configuration in FIG. 25 having three functions (sc1, sc2 and sc3) and 6 shift register elements and transform to Galois (though to one skilled in the art it should be apparent that one can also start with Galois and transform to Fibonacci) in FIG. 26.

The truth tables of the ternary functions sc1, sc2 and sc3 are shown in the following tables.

| sc1 | 0 | 1 | 2 |
|---|---|---|---|
| 0 | 2 | 1 | 0 |
| 1 | 1 | 0 | 2 |
| 2 | 0 | 2 | 1 |

| sc2 | 0 | 1 | 2 |
| --- | --- | --- | --- |
| 0 | 0 | 2 | 1 |
| 1 | 1 | 0 | 2 |
| 2 | 2 | 1 | 0 |

| sc3 | 0 | 1 | 2 |
| --- | --- | --- | --- |
| 0 | 0 | 1 | 2 |
| 1 | 1 | 2 | 0 |
| 2 | 2 | 0 | 1 |

The sequence generator as shown in FIG. 25 will create a maximum-length 3-valued pseudo-noise sequence of 728 symbols with a 2-level auto-correlation. Assume that the initial content of the shift register is [1 0 0 2 0 1]. The equivalent Galois sequence generator (applying the mirroring-rules) is provided in FIG. 26. Of the 3-valued switching functions sc1, sc2 and sc3; sc1 and sc3 are commutative and sc2 is non-commutative. This means that sc1=sc1$^T$ and sc3=sc3$^T$. The truth table of sc2$^T$ is provided in the following table.

| sc2$^T$ | 0 | 1 | 2 |
| --- | --- | --- | --- |
| 0 | 0 | 1 | 2 |
| 1 | 2 | 0 | 1 |
| 2 | 1 | 2 | 0 |

The sequence generator of FIG. 26 will create a shifted equivalent pn-sequence of the Fibonacci generator when both start with initial content [1 0 0 2 0 1]. The 6-element/3function Galois generator will create exactly the same sequence as the Fibonacci one if the initial content of the Galois shift register is [1 1 0 2 0 0].

The Binary Case

The same equivalence transformation between Fibonacci and Galois configurations can be applied to other shift register/tap/function configurations as well for any n-valued sequence generator of maximum length sequences, including the binary one. One may for instance use the sequence generator as shown in the ternary logic form in FIGS. 25 and 26 and replace all elements by binary elements (functions and shift register). In general one uses the binary XOR function as binary logic function in this type of circuits. The transposition of the truth table of the XOR is of course again a XOR. So the transformation from Fibonacci to Galois when only XOR functions are used, only require exchange of the position of the functions. If the initial shift register content is [1 0 0 1 0 1] in the Fibonacci case then its Galois configuration will generate exactly the same sequence (in-phase) when the initial shift register content is [1 1 0 0 0 1].

Things can be come a little more complicated if one mixes XOR and EQUAL functions in a single realization. Though of course the transposition of an EQUAL function is again an EQUAL function, the transformation rule requires that the order changes. So if in the Fibonacci configuration sc1=XOR, sc2=XOR and sc3=EQUAL, then in the Galois configuration sc3$^T$=EQUAL, sc2$^T$=XOR and sc1$^T$=XOR.

Accordingly it is possible for any Fibonacci configuration of any n-valued sequence generator of maximum length sequences, wherein all functions are reversible, to create a Galois configuration that will generate exactly the same (in-phase) sequence and vice-versa.

Detecting Sequences

The inventor has shown earlier how a type of descrambler can be used to detect sequences that are created by Fibonacci generators. See for instance US Patent Application Publication no. 20050184888 filed on Feb. 25, 2005 entitled: GENERATION AND DETECTION OF NON-BINARY DIGITAL SEQUENCES, which is incorporated herein in its entirety. In this section it will be shown how shift register circuits can be applied to detect sequences generated by shift register circuits, also when these circuits or methods are in Galois configuration.

Figure 27:
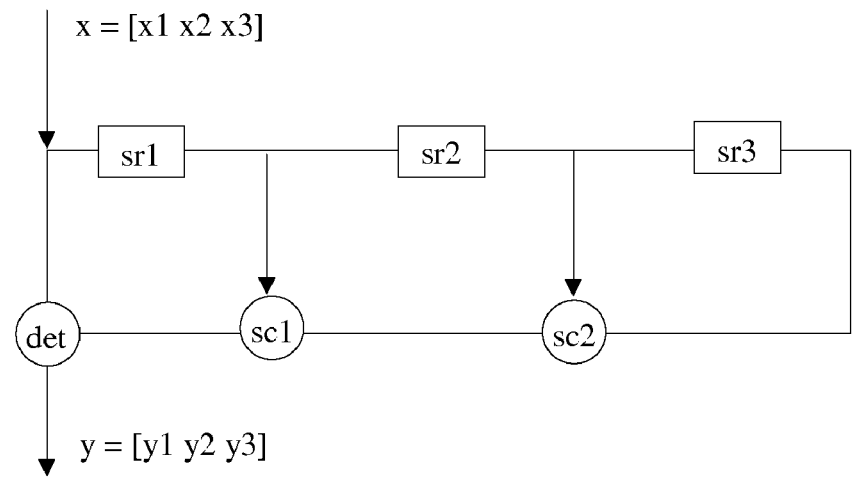
FIG. 27 is a diagram of a sequence detector in Fibonacci configuration.

As an illustrative example assume that a sequence is generated by the method or circuit as shown in the diagram of FIG. 23. The sequence generated by that generator can be detected by the descrambler type solution as shown in FIG. 27.

One can make different choices for the function 'det'. The only restriction to 'det' for detection purposes is that the diagonal of its truth table has identical values or states. The reason for that is that if the input signal 'x' is generated by the sequence generator that corresponds with the detector configuration; and the content of the shift register is correct; then both inputs to 'det' will provide identical signals. For instance assume that correct detection means that the output signal 'y' is all 0s. Then the diagonal of the truth table of 'det' should be all 0.

The advantage of the shown Fibonacci configuration is that if the content of the shift register is not correct even if the input signal 'x' is a correct sequence, then at most only 3 symbols can be detected wrongly. That is because the shift register will be flushed.

Assume that one would like to determine at the occurrence of the signal 'x' if the correct sequence is present. The way to do this is at every clock pulse to assume that the correct signal is present and can be detected. On that assumption one can then determine the content of the shift register that would correspond with correct detection. Next, one should make the calculated shift register content the actual shift register and run the detector. If not a correct 'sequence detect' signal (0s in our illustrative example) is generated after more than 3 pulses then at the next input signal one should recalculate the correct content.

This method applies the following reasoning.

a. assume that the next 3 consecutive input symbols [x1 x2 x3] are part of the correct to be detected sequence;
b. the output y=[y1 y2 y3] as a result of the input should be [0 0 0];
c. the initial content of the shift register is [s1 s2 s3] when the input signal is x1.

This will give the following equations:

$$x1=\{s3sc2s2\}sc1s1$$

$$x2=\{s2sc2s1\}sc1x1$$

$$x3=\{s1sc2x1\}sc1x2$$

With solutions:

$$s1=\{x3sc1^{-1}x2\}sc2^{-1}x1$$

$$s2=\{x2sc1^{-1}x1\}sc2^{-1}s1$$

$$s3=\{x1sc1^{-1}s1\}sc2^{-1}s2$$

The use of inverse function in these expressions may be confusing. As the functions may be non-commutative in general (a sc1 b)≠(b sc1 a). So in solving these equations one should carefully check if one applies the correct inverse function. The order of inputs is selected in such a way that an input from one side of a function determines the row input and an input from the top determines the column in a truth table. It is assumed in general that in (a sc1 b) input 'a' determines the row and 'b' determines the column in the truth table.

This novel method as an aspect of the present invention allows calculating the correct shift register content at any time assuming that the correct sequence is being received. This method can be used for any length shift register and for any n-valued logic (including binary) as all functions at the taps have to be reversible. This method may not be extremely urgent in Fibonacci configurations (because of shift register flushing) however it is very useful in Galois configurations. This is because in some Galois configurations error propagation in the shift register will occur. Calculating the correct shift register content after an error has occurred may stop error propagation.

Figure 28:
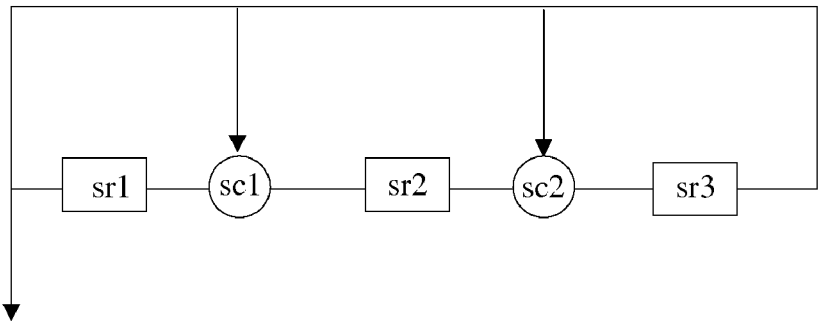
FIG. 28 is a diagram of a sequence generator in Galois configuration.
Figure 29:
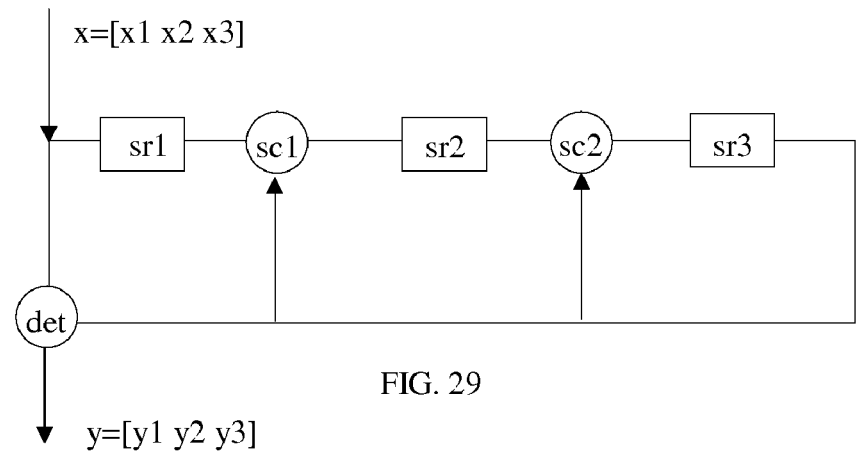
FIG. 29 is a diagram of a sequence detector in Galois configuration in accordance with an aspect of the present invention.

As an illustrative example the Galois sequence generator shown in the diagram of FIG. 28 will be used. A detector for the sequence created with this generator is shown in the diagram of FIG. 29.

Assuming that the correct sequence is at the input one can create the following equations.

$x1=s3$ $x2=(s2 sc2 s3)$ $x3=\{s1 sc1 s3\} sc2 \{s2 sc2 s3\}=\{s1 sc1 s3\} sc2 x2$

This leads to the following states of the shift register:

$s3=x1$ $s2=(x2 sc2^{-1} x1)$ $s1=\{(x3 sc2^{-1} x2) sc1^{-1} x1\}$

Assume that one uses the (in this case 3-valued) functions with the following truth tables.

| sc1 | 0 | 1 | 2 |
|---|---|---|---|
| 0 | 0 | 1 | 2 |
| 1 | 1 | 2 | 0 |
| 2 | 2 | 0 | 1 |

| sc2 | 0 | 1 | 2 |
|---|---|---|---|
| 0 | 0 | 1 | 2 |
| 1 | 2 | 0 | 1 |
| 2 | 1 | 2 | 0 |

| det | 0 | 1 | 2 |
|---|---|---|---|
| 0 | 0 | 1 | 2 |
| 1 | 2 | 0 | 1 |
| 2 | 1 | 2 | 0 |

The sequence generated with initial register state [1 0 2] is the pn-sequence seq3__26=[2 2 2 1 0 0 2 2 0 2 0 1 2 1 1 1 2 0 0 1 1 0 1 0 2 1].

Inputting this sequence to the detecting circuit with initial shift register state [1 0 2] will generate res=[0 0 0 0 0 0 0 0 0 0 0 0 0 0 0 0 0 0 0 0 0 0 0 0 0 0]. One can demonstrate the effect of error propagation in Galois type detectors by changing the initial content of the shift register of the detector to for instance [1 0 0]. The result at the output of the detector is then: res_er=[2 2 0 1 1 0 2 2 0 1 1 0 2 2 0 1 1 0 2 2 0 1 1 0 2 2]. Clearly one would conclude on this basis that an incorrect sequence was received.

In order to start or restart the Galois detector at any time one would need to make sure that the correct content is in the shift register. The first way to do that is to use the formulations that calculate the correct content assuming that the correct sequence without errors is available at the input of the detector. Applying the already determined expressions:

$s3=x1$ $s2=(x2 sc2^{-1} x1)$ $s1=\{(x3 sc2^{-1} x2) sc1^{-1} x1\}$

The truth tables of the inverse functions are provided in the following tables.

| $sc1^{-1}$ | 0 | 1 | 2 |
|---|---|---|---|
| 0 | 0 | 2 | 1 |
| 1 | 1 | 0 | 2 |
| 2 | 2 | 1 | 0 |

| $sc2^{-1}$ | 0 | 1 | 2 |
|---|---|---|---|
| 0 | 0 | 1 | 2 |
| 1 | 2 | 0 | 1 |
| 2 | 1 | 2 | 0 |

One can determine the initial state when the first three elements of the sequence are [2 2 2]. Inserting the values of the symbols in the equations will generate:

$s3=2$ $s2=(2 sc2^{-1} 2)=0$ $s1=\{(2 sc2^{-1} 2) sc1^{-1} 2\}=\{0 sc1^{-1} 2\}=1$

This means that the initial content should be [1 0 2].

One can apply the same approach for instance by starting at symbol 4 of the sequence and registering the first 3 symbols as of symbol 4. That means [x1 x2 x3]=[1 0 0]. This requires for correct decoding that the setting of the shift register is [2 1 1] by applying the above equations.

This method can be extended to any n-valued sequence generator including the binary one. Clearly long shift registers with relatively many taps will create more complex expressions. However the method will still work. The equations become easier to solve if one applies adders and multipliers over GF(2^p) with p>1. Adders will be commutative, self-reversing and associative.

The method works as well for the binary case, especially because the XOR and EQUAL functions are commutative and associative and self-reversing. These aspects make the solving equations easier to be determined. They apply in general to LFSRs having adders over GF($2^p$) with $p \geq 1$ wherein p=1 is of course the binary case. An illustrative 4-valued example will be provided.

Figure 30:
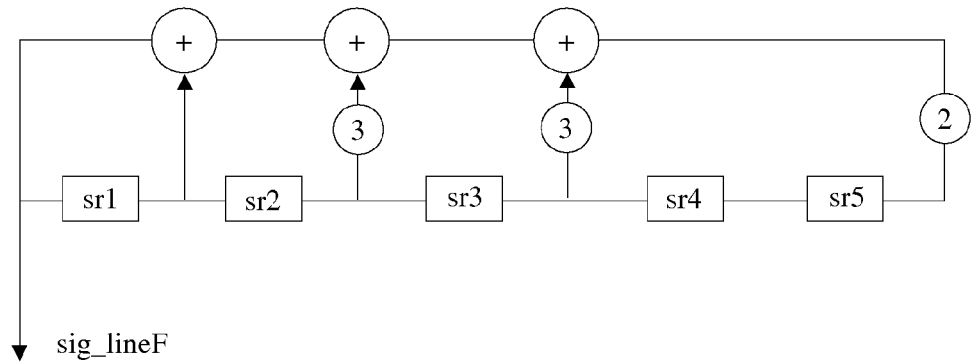
FIG. 30 is a diagram of a sequence generator in Fibonacci configuration.

In FIG. 30 a 4-valued sequence generator in Fibonacci configuration is provided, wherein the adder '+' is an adder over GF(4) and the multipliers 2 and 3 are multipliers over GF(4). The truth tables of '+' and '×' are provided in the following tables.

| + | 0 | 1 | 2 | 3 | x | 0 | 1 | 2 | 3 |
|---|---|---|---|---|---|---|---|---|---|
| 0 | 0 | 1 | 2 | 3 | 0 | 0 | 0 | 0 | 0 |
| 1 | 1 | 0 | 3 | 2 | 1 | 0 | 1 | 2 | 3 |
| 2 | 2 | 3 | 0 | 1 | 2 | 0 | 2 | 3 | 1 |
| 3 | 3 | 2 | 1 | 0 | 3 | 0 | 3 | 1 | 2 |

Figure 31:
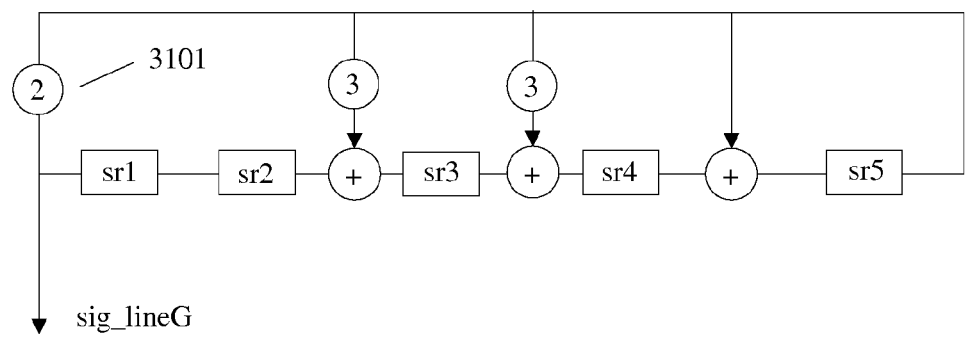
FIG. 31 is a diagram of a sequence generator in Galois configuration.

The generator of FIG. 30 generates a 1023 4-valued symbol maximum length sequence. The matching Galois configuration is shown in FIG. 31. Again one sees that the Galois and Fibonacci configurations are mirrored over the diagonal of the Fibonacci configuration: that is: the taps move to mirror positions (including the multipliers) and the functions go in transposed positions. Because the 4-valued '+' is commutative, the functions will appear as being the same.

Figure 32:
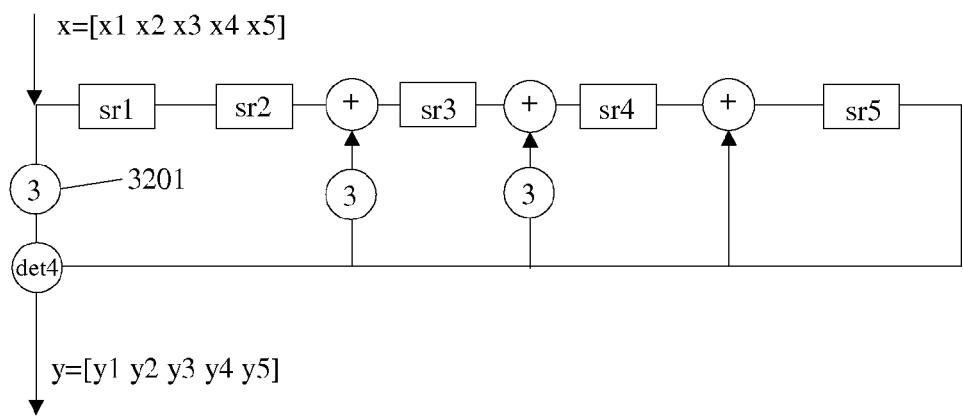
FIG. 32 is a diagram of a sequence detector in Galois configuration in accordance with an aspect of the present invention.

A detector in Galois configuration for the sequence generated by the generator of FIG. 31 is shown in FIG. 32. One should take care in reversing the multiplier of 3101 in FIG. 31 to the multiplier 3201 in FIG. 32 to correctly detect the sequence. The function 'det4' can for instance be the '+' in GF(4).

One can see from the multiplier truth table that the inverse of multiplication by 3 is multiplication by 2 in GF(4). One may also circumvent the issue of multipliers by first eliminating the multipliers in the Fibonacci configuration in accordance with a method shown by the inventor in U.S. patent application Ser. No. 11/679,316 filed on Feb. 27, 2007 entitled METHODS AND APPARATUS IN FINITE FIELD POLYNOMIAL IMPLEMENTATIONS which is hereby incorporated herein by reference in its entirety. After eliminating the multipliers one can then apply the conversion rule being an aspect of the present invention and then create the appropriate detector in Galois configuration which will then have no multipliers.

As an illustrative example of calculating the correct initial content of the Galois detector with multipliers the detector of FIG. 32 will be analyzed.

Assume that the initial state of the shift register of the detector of FIG. 32 is [a1 a2 a3 a4 a5] when at the input the signal x=[x1 x2 x3 x4 x5] is provided and the signal y=[y1 y2 y3 y4 y5] will be generated at the output. Assume that the state of the shift register is correct and that the input signal was generated by the corresponding sequence generator. Using the 4-valued function '+' is 'det4' as the detection function in FIG. 32 then the output signal y=[0 0 0 0 0]. All functions and multipliers are reversible, and accordingly one can create sufficient equations to solve a1, a2, a3, a4 and a5 as the unknowns. The Galois LFSR is somewhat more complicated because at every clock pulse the content of a shift register element after a function is different from the content of preceding shift register element at the previous clock pulse.

However the conditions are set in such a way that the content of the last shift register element is easily determined by the equation yn=(3*xn det4 sr5), wherein det4 is the 4-valued adder over GF(4) and 3* is a multiplier over GF(4) and sr5 is the content of the last shift register element. One can then for the first clock pulse determine that: y1=x1+3*sr5 or 0=x1+3*sr5.

Assume that the generated sequence starts with [x1 x2 x3 x4 x5]=[2 2 2 0 0]. One can then easily calculate [a1 a2 a3 a4 a5]. It should be clear that one may apply this approach at any stage of a sequence. Once [a1 a2 a3 a4 a5] is known one can then calculate y6 by using the calculated states of the shift register. If one is receiving a correct sequence then y6 will also be 0. If not one, can re-calculate the shift register content as shown here from x2 to x6 and check if the then next outputted symbol is a 0. Based on expected symbol error ratio one can perform this several times. If for several cycles the output of the detector is not 0 one may decide that not the correct sequence was received and that non-receiving was not due to errors.

One approach to calculate the value of [a1 a2 a3 a4 a5] is to assume that the content of the shift register of FIG. 32 in 5 consecutive clock cycles is provided by:

| initial: | [a1 a2 a3 a4 a5] |
| after pulse 1: | [b1 b2 b3 b4 b5] |
| after pulse 2: | [c1 c2 c3 c4 c5] |
| after pulse 3: | [d1 d2 d3 d4 d5] |
| after pulse 4: | [e1 e2 e3 e4 e5] |

The relation between the consecutive states can be expressed as:

| initial: | [a1 a2 a3 a4 a5] |
| after pulse 1 | [x1 a1 (a2 + 3*a5) (a3 + 3*a5) (a4 + a5)] |
| after pulse 2 | [x2 x1 (b2 + 3*b5) (b3 + 3*b5) (b4 + b5)] |
| after pulse 3 | [x3 x2 (c2 + 3*c5) (c3 + 3*c5) (c4 + c5)] |
| after pulse 4 | [x4 x3 (d2 + 3*d5) (d3 + 3*d5) (d4 + d5)] |

The above provides the representation of the states of the shift register after a pulse match with the previous representation.

Accordingly one can create sets of equations. For instance the earlier representation shows that after (clock) pulse 1 the content of the third shift register element is b3. This is equal to (a2+3*a5) and leads to b3=(a2+3*a5), keeping in mind that '+' and '*' are defined in GF(4) and were already presented as truth tables. Assuming that the correct sequence was detected so the output y=[0 0 0 0 0]. Accordingly: 0=3*x1+a5; 0=3*x2+b5; 0=3*x3+c5; 0=3*x4+d5; and 0=3*x5+e5. The 4-valued function '=' is associative, commutative and self-reversing, and accordingly: a5=3*x1; b5=3*x2; c5=3*x3; d5=3*x4; and e5=3*x5.

The solution, expressing the shift register content [a1 a2 a3 a4 a5] in x1, x2, x3, x4 and x5 will provide:

$a1 = 3*3*x2 + 3*3*x3 + 3*x4 + 3*x5$ $a2 = 3*3*x1 + 3*3*x2 + 3*x3 + 3*x4$ $a3 = 3*3*x1 + 3*x2 + 3*x3$ $a4 = 3*x1 + 3*x2$ $a5 = 3*x1$

For instance assume that 5 consecutive 4-valued symbols created by the sequence generator of FIG. 31 are x=[2 2 2 0 0]. A correct detection requires that [a1 a2 a3 a4 a5]=[0 1 3 0 1]. This is the correct initial state of the LFSR of FIG. 31 to generate the sequence.

The detector can be used to indicate that either symbol errors have occurred in the received sequence or that the wrong sequence is being detected for the content of the shift register, or a wrong state shift register state is being used. This is indicated when the output of a detector does not generate identical symbols (such as 0s in the illustrative example).

Accordingly the calculation of the state or the content of the shift register of a detector LFSR in Galois configuration provides at least two useful applications in detection of sequences of symbols.

As an aspect of the present invention one can restart the Galois detection of a sequence of symbols created by a sequence generator, in which errors have occurred. While this Galois configuration detector is not self synchronizing, one may overcome the errors by calculating the correct shift register content.

As another aspect of the present invention, one can also use the method of calculating the content of the shift register to detect the presence of a sequence. In telecommunication applications such as CDMA cell phone systems, often an LFSR generated m-sequence is used, wherein for individual users a shifted version of such sequence is applied. The correlation between an m-sequence and a shifted version is Low, while the correlation between two identical sequences is High. FIG. 19 shows a correlation graph that demonstrates this aspect. In general one requires a sufficient amount of symbols of a sequence to determine a correlation graph.

Assuming that a sequence is error free, one has one of two situations: either a sequence in a correct phase is received, or a sequence not in correct phase is received. If a sequence is not in a correct phase it should be rejected and treated as for instance noise. The current reconstruction method for determining the content of the shift register in Galois configuration offers a rapid and simple detection method. In general receivers maintain a low power clock circuit which allows a receiver to determine a phase with a main sequence generator. In fact one often applies this to synchronize an offset mask for generating an expected sequence when part of a receiving circuit comes out of a sleep mode. In the detection method one uses a clock signal to determine a state of a shift register based on an assumed correct reception of a sequence. At the same time one retrieves from a memory the known correct state that an LFSR should have at a certain moment if the correct sequence was received.

It was shown by the inventor that an LFSR generating an m-sequence (be it binary or n-valued with n>2) that over the length of the sequence being generated at every clock pulse the content of the shift register is different from any other state of the shift register during the generation of the m-length sequence. This is for instance described in U.S. patent application Ser. No. 11/427,498, filed on Jun. 29, 2006 entitled The Creation and Detection of Binary and Non-Binary Pseudo-Noise Sequences Not Using LFSR Circuits which is incorporated herein by reference in its entirety. This means that a calculated content of the shift register of a detector detecting an out-of-phase sequence, the out-of-phase sequence will be different from the calculated content of the shift register in the detector from an in-phase sequence. Accordingly one can correctly distinguish between sequences in different phases by calculating the content of the shift register of a detector and comparing it to the known required content which is for instance stored in a memory.

Figure 33:
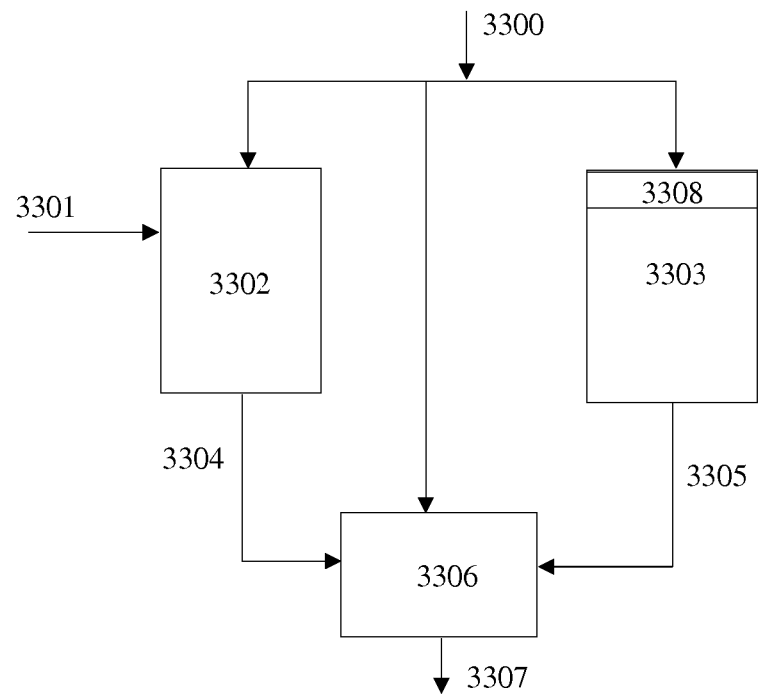
FIG. 33 is a diagram of a system for sequence detection in accordance with an aspect of the present invention.

A diagram for such a detector is provided in FIG. 33. A unit 3302, which can for instance comprise a processor which may use A/D converters to convert n-valued signals in binary words, is used to calculate from k incoming symbols the required state of a state register with k elements at a moment t0, assuming that at moment t0 the first of k correct n-valued symbols of a sequence were received. N-valued symbols are received on an input 3301. A clock signal is provided on an input 3300. After k incoming symbols have been received the calculated state of the shift register is provided on output 3304. The clock signal is also provided to a memory unit 3303 that has stored the correct state of the LFSR related to a sequence in a certain phase, and makes it available on an output 3305. The memory 3303 may contain a unit 3308 that controls a delay time for providing the stored state of the LFSR on the output, to make sure that both units 3302 and 3303 will provide information at the appropriate time. The output of the units 3303 and 3305 is inputted to a comparator 3306, which compares the inputs from 3303 and 3305. The comparator 3306 also may use the clock signal 3300 to determine when to execute the comparison, which may include calculating a delay. A signal acknowledging identity or difference between the inputs will be provided on an output 3307. One may make a decision after just calculating 1 content. One may also compare several consecutive or non-consecutive calculated and known states to make sure that potential errors in a received signal are dealt with based on a certain symbol error ratio.

The method and apparatus here provided works for n with n>2 as well as for binary detection. A first illustrative 4-valued example will be provided. Herein the sequence generator in Galois configuration is shown in diagram in FIG. 34. The function '+' is the earlier provided 4-valued adder over GF(4). The multiplier 3401 is a multiplication with factor 2 according to the earlier provided multiplication over GF(4). One may reduce the structure in such a way that no multipliers are used. A multiplier is used in the example.

Figure 34:
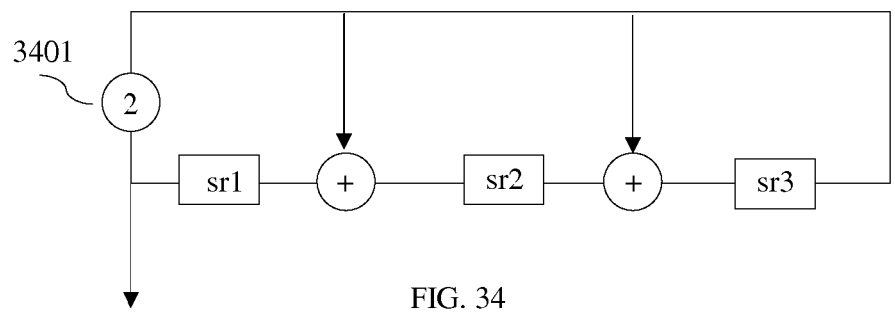
FIG. 34 is a diagram of a sequence generator in Galois configuration.
Figure 35:
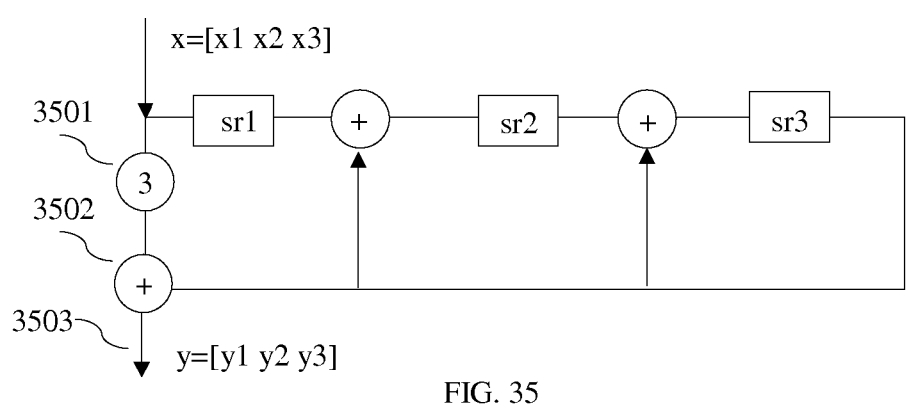
FIG. 35 is a diagram of a sequence detector in Galois configuration in accordance with an aspect of the present invention.

The corresponding detector is shown in FIG. 35. The detector is the generator flipped along the horizontal axis, wherein now a detecting function 3502 is inserted. The detecting function preferably has a truth table with the diagonal providing identical states. The '+' function meets this requirement and thus is applied as detecting function. The input to the first element of the shift register may be considered the input to the LFSR of the detector and to the detector. The input to the LFSR is also connected to a multiplier 3501 which should reverse the multiplier 3401 in the generator of FIG. 34. This is the multiplier 3 over GF(4). Further more the input to the detector is connected to the input of the multiplier 3501. The output of the multiplier 3501 is connected to a first input of function 3502 and the output of the last element of the shift register of the LFSR is connected to a second input of the function 3502. When the correct sequence is received and the shift register has the correct state the output 3503 will generate all 0s.

As before all LFSRs work under control of a clock signal which is assumed but not shown. Assume that the generator of FIG. 34 has an initial shift register content [sr1 sr2 sr3]=[1 3 0]. The generator will provide a 4-valued maximum length sequence of 63 symbols of which the first 16 symbols are [0 1 3 2 3 0 0 1 1 0 3 1 2 2 2 3].

Figures 36, 37, 38:
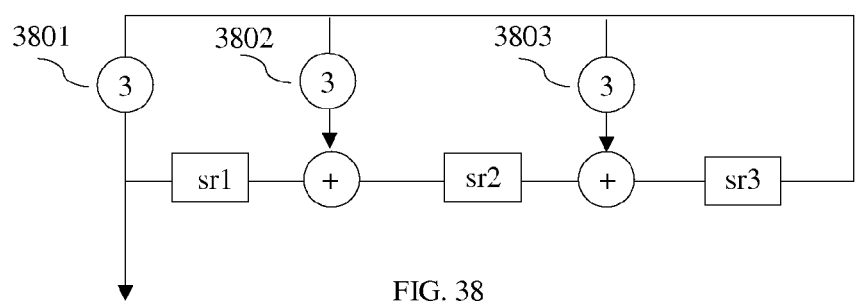
FIG. 36 is a table with consecutive states of a shift register in Galois configuration.
FIG. 37 is another table with consecutive states of a shift register in Galois configuration.
FIG. 38 is a diagram of a sequence generator in Galois configuration.

The table in FIG. 36 provides the content of the shift for the first 16 clock pulses. One can see that the content of the first element of the shift register is identical to the first 16 symbols of the sequence.

The content of the shift register [sr1 sr2 sr3] based on the assumption of the received sequence [x1 x2 x3] being the correct one can be calculated from:

$$sr1=3*x1+3*x2+3*x3$$

$$sr2=3*x1+3*x2$$

$$sr3=3*x3$$

One can then input series of 3 consecutives symbols into the above equations to generate a shift register table. For the current case that is a table identical of course to the table of FIG. 36.

Assume that the received sequence is out of phase by two symbols with the here provided sequence. The first 16 symbols of the sequence are then: [3 2 3 0 0 1 1 0 3 1 2 2 2 3 2 2]. The first 16 calculated states of the shift register using the above equations are provided in the table of FIG. 37. Not unexpectedly the table of FIG. 37 is different from FIG. 36. The table is shifted in vertical direction by 2 positions. This means that at any time the content of a table with shift register states corresponding with a sequence in a certain phase is different from a table representing the states of the same sequence in a different state. Accordingly one can detect a sequence in a certain phase and distinguish it from the same sequence in a different phase.

The here provided method and apparatus can also be applied to distinguish between a first m-sequence generated by the generator of FIG. 34 for instance and a second sequence generated by a different sequence generator. In an illustrative example a 4-valued m-sequence of 63 symbols will be generated by the generator of which a diagram is provided in FIG. 38. As one can see this generator has three multipliers 3801, 3802 and 3803 all being a multiplier 3 over GF(4). The reason to use this example is because the shift register of this generator will have all the states of the generator of FIG. 34, but substantially in a different order. The first 16 symbols of the sequence generated from the initial shift register state [1 3 0] are [0 2 2 0 0 1 3 1 2 0 2 0 1 2 2 3].

One can provide this sequence to the comparator 3303 of FIG. 33. The unit will then generate the calculated states as provided in the table of FIG. 39. Comparing the table of FIG. 39 with FIG. 36 of the correct sequence shows that in certain cases one has to compare a series of consecutive states before deciding if a sequence was detected. In this case the shift register contents [2 0 1], [2 3 1] and [2 3 2] appear in the same order in the same phase. After this the correct and calculated shift register content will be different again. However it is clear that in such situations at least 4 consecutive shift register contents should be calculated and compared in order to arrive at a correct decision of detection.

As illustrative examples 4-valued LFSRs are used wherein '+' and 'x' are defined over GF(4). This makes symbol manipulation fairly simple as the operations are commutative, reversible, distributive and associative. It should be appreciated that the here provided method works for any reversible n-valued function with reversible n-valued inverters. Symbol manipulation may be not as easy as in an extended binary field; however solutions can be determined and applied.

One can use the here provided method and apparatus also in the binary case. A diagram of a binary sequence generator in Galois configuration is provided in FIG. 40. It has 5 shift register elements. The binary function '+' is the XOR function. The corresponding detector is provided in FIG. 41. The binary detection function 40001 is also a XOR function. In case of correct detection of the sequence generated by the generator of FIG. 40 by the detector of FIG. 41 the following relations hold between the state of the shift register at detection of $x1$ between the state register content [sr1 sr2 sr3 sr4 sr5] and the input signal during 5 consecutive input symbols [x1 x2 x3 x4 x5].

$$sr1 = x3 + x5$$

$$sr2 = x2 + x4$$

$$sr3 = x1 + x3$$

$$sr4 = x2$$

$$sr5 = x1$$

Figures 39, 40:
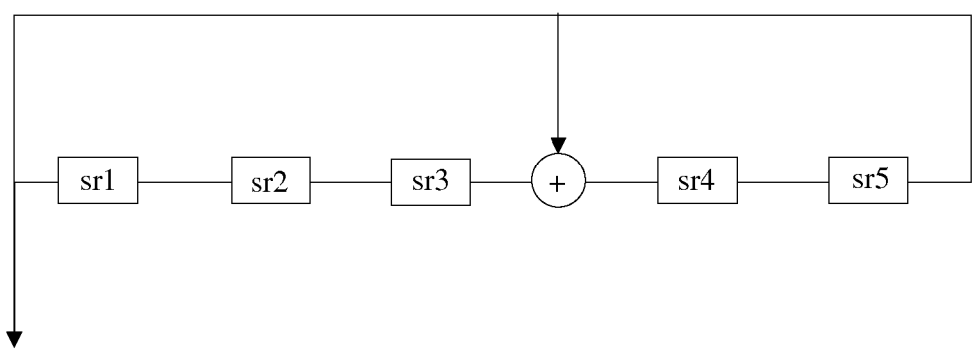
FIG. 39 is another table with consecutive states of a shift register in Galois configuration.
FIG. 40 is a diagram of a sequence generator in Galois configuration.

The first 16 symbols generated by the generator of FIG. 40 with initial content of the shift register [0 1 0 0 1] are [1 0 1 1 1 0 1 1 0 0 0 1 1 1 1 1].

Figures 41, 42:
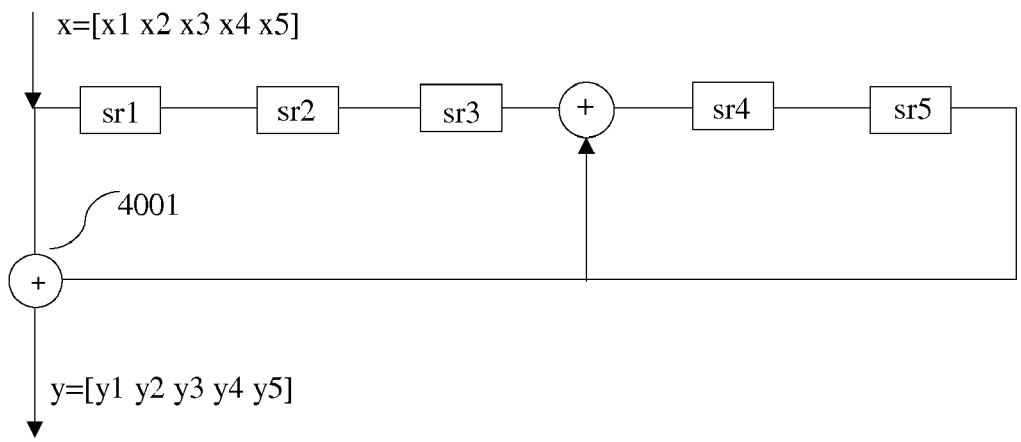
FIG. 41 is a diagram of a sequence detector in Galois configuration in accordance with an aspect of the present invention.
FIG. 42 is a table with consecutive states of a shift register in Galois configuration.

FIG. 42 shows a table with consecutive shift register content for the generator of FIG. 40, which is identical to the calculated content of the shift register of the detector when the sequence in correct phase is detected. As before, every shift register content is unique and different from every other shift register content if only sequences being phase shifted versions of each other are received.

Figures 43, 44:
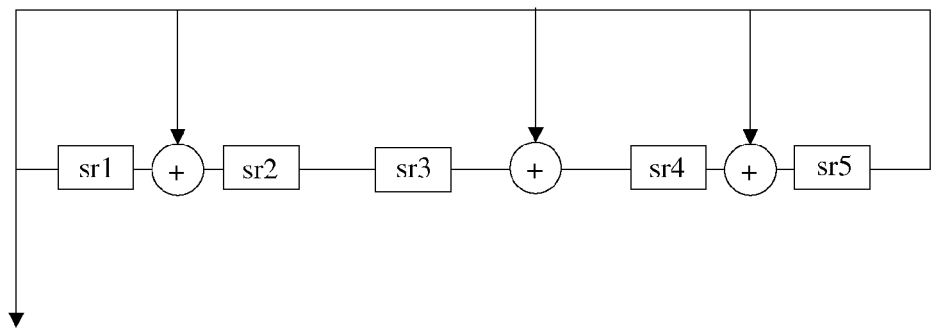
FIG. 43 is a diagram of a sequence generator in Galois configuration.
FIG. 44 is a table with consecutive states of a binary shift register in Galois configuration.

FIG. 43 shows a diagram of another binary m-sequence generator. This generator has the same number of shift register elements as the one FIG. 40. Accordingly both generators will have the same set of contents of the shift register, only in substantially different order. Assume that the generator of FIG. 43 starts with the same shift register content as FIG. 40. The shift register content calculated by the detector of FIG. 41 is shown in the table of FIG. 43. In this case only the $9^{th}$ row of the table of FIG. 44 and FIG. 42 have a content in common, the content being [1 1 0 0 0]. Accordingly the method as provided can also used to detect between sequences generated by different generators. Such detection in most cases may require calculating multiple contents to address common content occurrences.

One application of detection as here provided for instance can be track location on a magnetic or optical disk, wherein a position can be marked by a sequence which can be detected by the present method or apparatus.

One can use the method and apparatus as provided in FIG. 33 also to distinguish between sequences generated by different sequence generators. In such a case one should compare several consecutive states.

Fibonacci and Galois Scramblers and Descramblers

Figure 4:
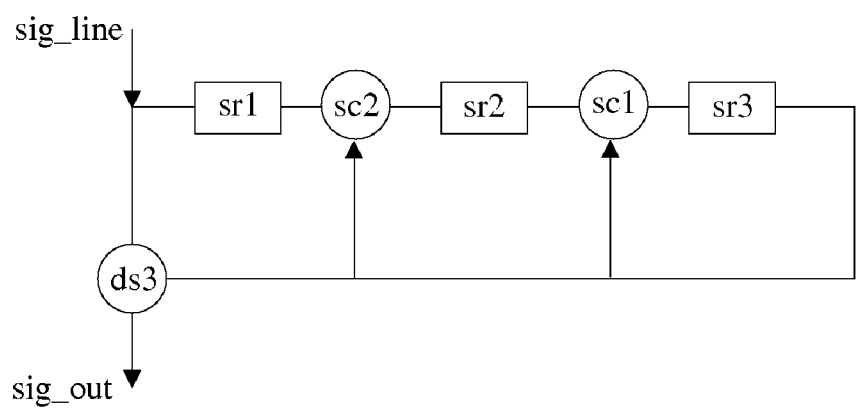
FIG. 4 is a diagram of an n-valued descrambler in Galois configuration.

It is another aspect of the present invention to provide identical Fibonacci and Galois scramblers and descramblers. Galois scramblers and descramblers have been provided. In the configuration as shown in FIG. 3 and FIG. 4 it has been demonstrated that the Galois scramblers and descramblers work as expected. However the Galois scramblers are not identical to the shown Fibonacci scramblers and a Fibonacci descrambler cannot descramble a sequence created by a Galois scrambler without extra measures. Such a possibility may be attractive as it would provide a fast scrambler and a perhaps slower, but self-synchronizing descrambler. In fact one could make descrambling faster by using the memory based descrambler or the multi-input function descrambler as demonstrated in an earlier section.

As an example of the provided method to achieve equivalence, a modified Galois scrambler derived from the one shown in FIG. 3 will be used.

Figure 45:
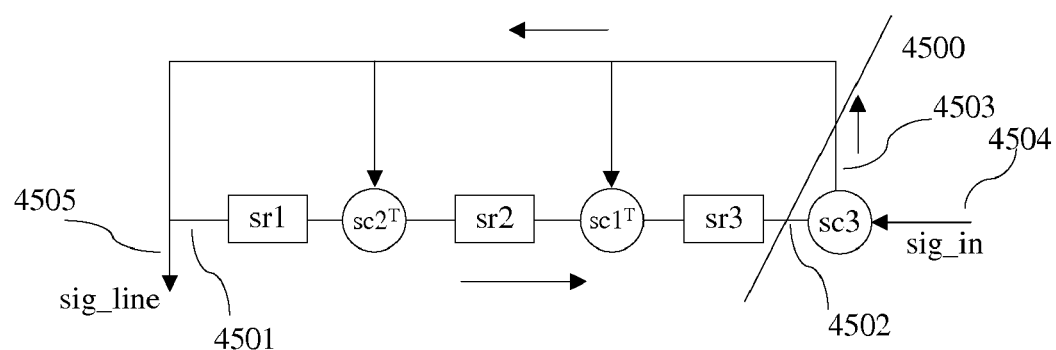
FIG. 45 is a diagram of a scrambler in Galois configuration in accordance with an aspect of the present invention.

The example starts with a scrambler in Fibonacci configuration as shown in FIG. 1. The equivalent Galois configuration descrambler is shown in FIG. 45. The modification applies the rules of transforming the sequence generator (mirroring the position of the taps) and transposing the truth tables of the functions at the taps from Fibonacci to Galois configuration. A novel element in the method is the change in position of function sc3 at the top left of the Fibonacci scrambler to the right of the modified Galois scrambler.

Figure 46:
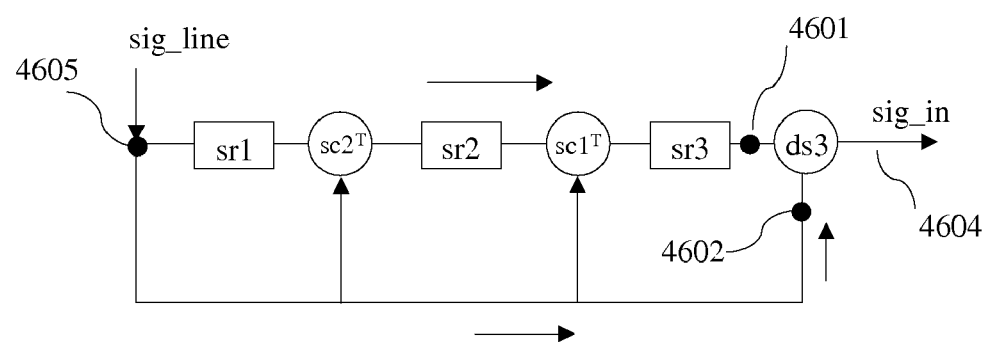
FIG. 46 is a diagram of a descrambler in Galois configuration in accordance with an aspect of the present invention.

The signal generated by the Galois scrambler of FIG. 45 is "out-of-phase" with the signal generated by the Fibonacci scrambler. However it turns out that that does not matter for the Galois descrambler as shown in FIG. 46 as it will self-synchronize after flushing. The following examples will illustrate the approach.

One can start out with a to be scrambled ternary sequence sig_in. sig_in=[0 1 2 2 1 1 2 0 0 1 2 0 0 1 2 0 1 0 2 1 1 1 0 2 1 0].

The Fibonacci scrambler of FIG. 1 has the functions with the following truth tables.

| sc1 | 0 | 1 | 2 | sc2 | 0 | 1 | 2 | sc3 | 0 | 1 | 2 |
|---|---|---|---|---|---|---|---|---|---|---|---|
| 0 | 0 | 2 | 1 | 0 | 0 | 1 | 2 | 0 | 0 | 1 | 2 |
| 1 | 1 | 0 | 2 | 1 | 1 | 2 | 0 | 1 | 1 | 2 | 0 |
| 2 | 2 | 1 | 0 | 2 | 2 | 0 | 1 | 2 | 2 | 0 | 1 |

Assume the initial state of the shift register to be [1 0 2] and the scrambled sequence is seq_f_scram=[2 2 1 2 0 1 1 0 1 1 2 0 0 2 1 2 0 0 0 1 2 2 2 0 0 1].

The Galois scrambler of FIG. 45 has functions with the truth tables:

| $sc2^T$ | 0 | 1 | 2 | $sc1^T$ | 0 | 1 | 2 | sc3 | 0 | 1 | 2 |
|---|---|---|---|---|---|---|---|---|---|---|---|
| 0 | 0 | 1 | 2 | 0 | 0 | 1 | 2 | 0 | 0 | 1 | 2 |
| 1 | 1 | 2 | 0 | 1 | 2 | 0 | 1 | 1 | 1 | 2 | 0 |
| 2 | 2 | 0 | 1 | 2 | 1 | 2 | 0 | 2 | 2 | 0 | 1 |

Assume the initial state of the shift register of the scrambler of FIG. 45 also to be [1 0 2]. This will create the scrambled sequence: sig_g_scram=[2 0 2 2 1 1 0 1 0 0 1 1 0 2 0 1 0 2 0 2 1 0 0 1 2 1]. This is clearly a different sequence than sig_f_scram. However if one makes the shift register initial state [1 1 2] then the sequence generated by the Galois scrambler is the same as the one from the Fibonacci scrambler.

The corresponding descrambler of the Galois scrambler of FIG. 45 is the Galois descrambler of FIG. 46, which is another aspect of the present invention. As before the descrambler is the mirror image of the scrambler, wherein the LFSR uses the same functions as in the scrambler. However as the scrambler has a scrambling function 'sc3', the descrambler has a descrambling function 'ds3' which is the reverse of 'sc3'.

The signal sig_g_scram is inputted into the descrambler of FIG. 46 on sig_line wherein ds3 has the truth table:

| ds3 | 0 | 1 | 2 |
|---|---|---|---|
| 0 | 0 | 2 | 1 |
| 1 | 1 | 0 | 2 |
| 2 | 2 | 1 | 0 |

When the initial state of the shift register is also [1 0 2] then the original signal sig_in will be provided on the output of the descrambler of FIG. 46.

As another aspect of the present invention the Fibonacci descrambler of FIG. 2 will be provided as a descrambler for the n-valued scrambler of FIG. 45. Assume the initial state of the shift register of this Fibonacci descrambler to be [1 0 2]. This will result into: sig_f_dscram=[0 2 2 2 1 1 2 0 0 1 2 0 0 1 2 0 1 0 2 1 1 1 0 2 1 0]. The first 3 symbols of the original input sequence were [0 1 2]. The equivalent initial states of the two scramblers of FIG. 1 and FIG. 45 are different for creating the same scrambled sequence. Accordingly a Fibonacci descrambler descrambling a Galois scrambled sequence has to be flushed of the 'wrong' symbols before descrambling correctly. However after flushing the descrambler correctly descrambles the signal scrambled by the Galois scrambler back into sig_in (except of course for the beginning during flushing if the initial content was not correct).

This approach works for any n-valued Fibonacci scrambler, by finding the corresponding Galois scrambler and descrambling with the Fibonacci descrambler. This includes the binary case. The Galois configuration scrambler of FIG. 45 is essentially different from the scrambler of FIG. 3. Both scramblers have the same LFSR. In FIG. 3 the LFSR is to the right of line 300. If the line 300 is a short circuit then FIG. 3 is a sequence generator. With the scrambling function 'sc3' connected to the LFSR FIG. 3 is a scrambler. In FIG. 3 301 is the input to the shift register and 302 is the output of the shift register. One input of 'sc3' is connected to output 302 and the output 303 of the scrambling function 'sc3' is connected to the input 301 of the shift register. Also an input of the LFSR functions (sc1 and sc2) is connected to the output of the LFSR.

The scrambler of FIG. 45 is almost identical to the scrambler of FIG. 3; however there are important differences. The LFSR is the part to the left of line 4500. If the line 4500 is a short circuit then the circuit id a sequence generator. However while the LFSR functions in FIG. 3 were directly connected to the output of the shift register, in FIG. 45 the functions $sc1^T$ and $sc2^T$ of the LFSR are not directly connected to the output 4501 of the shift register. In FIG. 45 the functions of the LFSR are connected to the output of the scrambling function sc3. Because one can descramble a sequence scrambled by the scrambler of FIG. 45 by a Fibonacci descrambler, the configuration as shown in FIG. 45 will be called a Galois LFSR configuration scrambler in Fibonacci equivalent mode.

Accordingly a method is provided to create a Fibonacci descrambler for a Galois scrambler. This method can be applied to binary and n-valued scramblers and descramblers.

The steps of this method are:
1. design an n-valued Fibonacci scrambler with p storage element shift register and q taps;
2. design the equivalent Galois scrambler, by changing the tap at position k to position (p-k) and the function from sc to $sc^T$.
3. use the Fibonacci descrambler corresponding to step 1 for descrambling the signal of step 2.

Accordingly a method has been provided that allows an n-valued or a binary sequence to be scrambled by a Galois type scrambler and to be descrambled by a Fibonacci (self-flushing) type descrambler.

The Self-Synchronizing Galois Descrambler

It is also possible to create a self-synchronizing descrambler in Galois configuration for a corresponding scrambler in Galois configuration. One can use a Galois scrambler in the Fibonacci equivalent mode, such as shown in FIG. 45, with a scrambling function connected directly to the output of the LFSR and the signal outputted by the scrambling function being the feedback signal. The corresponding descrambler in Galois configuration is shown in FIG. 46. Comparing the scrambler of FIG. 45 with the descrambler of FIG. 46 one can see that the input 4504 to the scrambler of FIG. 45 becomes the output 4604 of the descrambler of FIG. 46. Further more the output 4505 of the scrambler of FIG. 45 becomes the input 4605 of the descrambler of FIG. 46. Further more the scrambling function sc3 of the scrambler of FIG. 45 becomes a descrambling function ds3 in the descrambler of FIG. 46 whereby functions 'sc3' and 'ds3' are each others reverse. This then provides a general rule for binary and n-valued corresponding scramblers and descramblers in Galois configuration.

One can easily conclude from the diagram of FIG. 46 that the descrambler is self-synchronizing. The symbols on the input 4605 provide new content for the shift register as well as the feed-forward signals. An occurring error will be shifted through the register elements. As the incoming signal becomes error free, so is the feed-forward signal, and so will be the outputted signal on 4604, once the errors are flushed from the shift register. As before, both the scrambler and descrambler LFSR are under control of a clock signal, not shown but may be assumed. Accordingly a self-synchronizing descrambler in Galois configuration has been provided.

For practical reasons one may identify 3 important nodes or terminals in the descrambler. The circuit within these terminals in the descrambler is not a Linear Feedback Shift Register but rather a Linear Forward Connected Shift Register (LFCSR), wherein the signal on the input is forwarded through taps to functions separating shift register elements. Herein 4605 is an input of the LFFSR, 4601 is a first output and 4602 is a second output of the LFCSR. In the configuration as shown in FIG. 46 4602 and 4605 are carrying the same signal. The following 4-valued illustrative example will show that in some cases 4602 and 4605 may have different signals.

In general a test to distinguish if a shift register in Galois configuration is in LFSR or in LFCSR mode is to identify a function connected between two shift register elements. If the function has an input connected to the output (potentially through an inverter) of the shift register, it is part of an LFSR. If it is connected (potentially through an inverter) to the input of the shift register it is part of an LFCSR.

The illustrative example is a 4-valued variation of the scrambler and descrambler combination as earlier provided in FIGS. 31 and 32. They are shown in Galois Fibonacci equivalent mode in FIGS. 47 and 48. The scrambler of FIG. 47 has a multiplier 4701 which is 2 over GF(4) in its input. The functions sc1, sc2, sc3, sc4 and ds4 are the earlier provided adder over GF(4). The descrambler of FIG. 48 has a multiplier 4801 in a corresponding position at the input. This multiplier, which inverts multiplication 2 over GF(4) and accordingly is a multiplication 3 over GF(4), can be considered an inverter, that reverses multiplier 4701, in order to correctly descramble. This condition for multipliers at the input is one general requirement for a correct descrambler corresponding to an n-valued scrambler in Galois configuration with an inverter at the input. Further more the descrambling function 'ds4' in the descrambler of FIG. 47 should reverse function 'sc4'. It is easy to see that the signals at 4802 and 4803 may be different.

Figure 47:
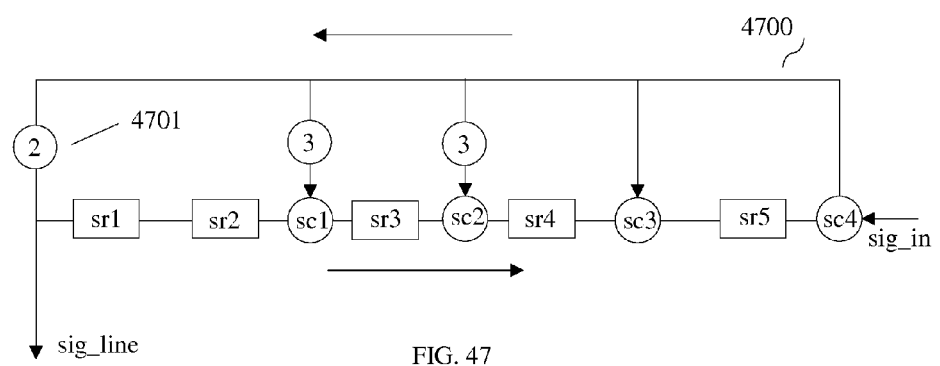
FIG. 47 is a diagram of a scrambler in Galois configuration in accordance with an aspect of the present invention.

Assume that the scrambler of FIG. 47 is provided with a 4-valued sequence sig_in=[0 1 2 3 0 1 2 3 0 1 2 3 0 1 2 3 3 2 1 0], the initial state of the shift register is [0 1 3 0 1], the '+' and '×' functions are the earlier provided 4-valued adder and multiplier over GF(4). The generated sequence sig_line=[2 0 3 1 3 3 1 1 2 1 1 0 2 0 0 2 3 2 3 0] Inputting sig_line into the descrambler of FIG. 48 with the same initial shift register content will again generate sig_in. Assume that symbols [1 1 2] in positions 7, 8 and 9 of sig_line experienced errors and are now [0 0 0]. Determining the difference of the descrambled sequence with sig_in provides [0 0 0 0 0 0 −1 0 0 −1 1 −2 1 2 0 0 0 0 0 0]. This shows that after the errors are flushed from the shift register the errors have disappeared from the descrambled sequence. This applies to any n-valued and binary Galois descrambler in Fibonacci equivalent mode, as long as the conditions for corresponding scramblers and descramblers are met.

In FIG. 47 the input of the shift register is also the input of shift register element sr1. In scramblers in Galois configuration like in FIG. 47 when it is stated that the output of a scrambling function (in FIG. 47 sc4 is the scrambling function) is connected to the input of a shift register it is intended to mean either directly without an inverter in the path from function output to shift register input, or indirectly, meaning like in FIG. 47 through an inverter such as for example inverter 4701. The same applies to connecting the output of the scrambling function to an input of a reversible function connecting two shift register elements, such as functions sc1, sc2 and sc3 in FIG. 47. While the output of sc4 is directly connected to an input of sc3, it is indirectly connected to an input of sc2 through an inverter. Accordingly connected herein means directly connected or indirectly connected through an inverter. This applies to scramblers, descramblers, detectors and sequence generators.

Figure 49:
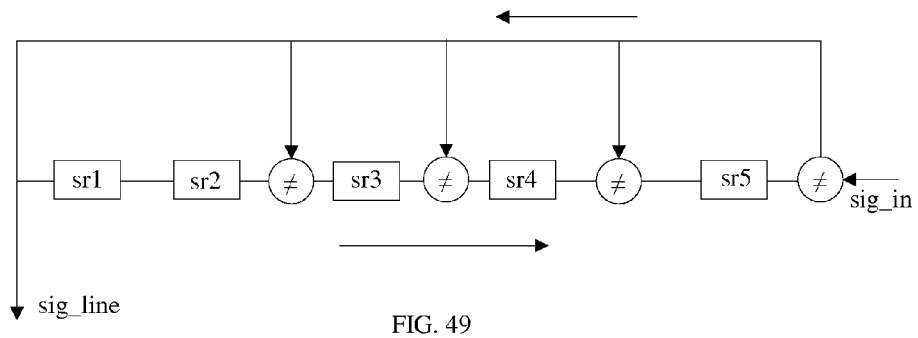
FIG. 49 is a diagram of a binary scrambler in Galois configuration in accordance with an aspect of the present invention.

One can check the method in the binary case by making all multipliers in FIG. 47 1 and replacing the 4-valued '+' with the 2-valued '+'. This binary Galois scrambler is shown in FIG. 49. Making the initial state of the shift register [0 1 1 0 1] and sig_in=[0 1 1 1 0 0 1 1 1 0 1 0 1 1 1 0 0 1 0 0] the binary scrambler of FIG. 49 will generate sig_line=[1 0 1 0 1 1 1 1 0 1 0 0 1 0 1 0 1 0 1 1]. Inputting sig_line into the corresponding descrambler as shown in FIG. 50 with an identical initial shift register content will generate sig_in again.

Figure 50:
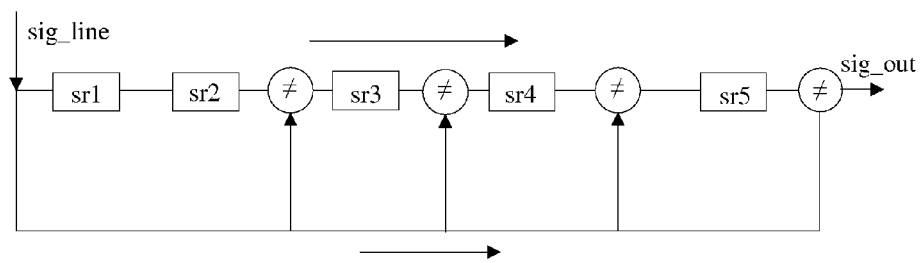
FIG. 50 is a diagram of a binary self-synchronizing descrambler in Galois configuration in accordance with an aspect of the present invention.

Replacing the first 4 symbols of sig_line as being in error by [0 1 0 1] and descrambling sig_line will generate a signal that differs with sig_in as [−1 0 1 0 −1 −1 0 1 1 0 0 0 0 0 0 0 0 0 0 0], which demonstrates that the Galois configuration descrambler of FIG. 50 is flushed of errors and thus is self-synchronizing.

Figure 51:
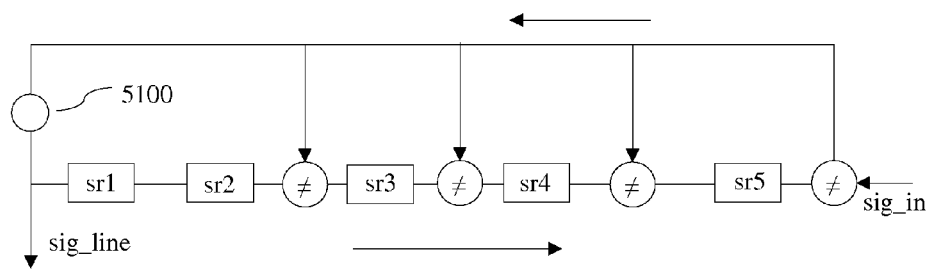
FIG. 51 is another diagram of a binary scrambler in Galois configuration in accordance with an aspect of the present invention.
Figure 52:
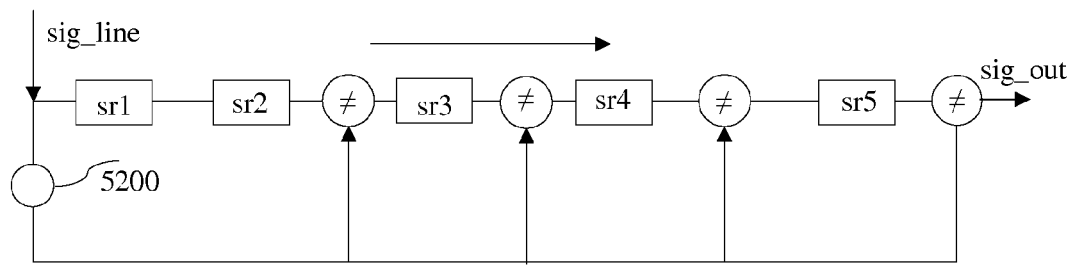
FIG. 52 is another diagram of a binary self-synchronizing descrambler in Galois configuration in accordance with an aspect of the present invention.

In FIG. 51 a binary scrambler is shown almost identical to the binary scrambler of FIG. 49. A difference is an inserted binary inverter 5100. The corresponding descrambler is shown in FIG. 52. FIG. 52 has an inverter 5200. FIG. 52 is the exact mirror not only in structure, but also in functions and inverters of FIG. 51. In fact, no matter where an inverter is inserted into a binary scrambler in Galois configuration in Fibonacci mode, its descrambler will be a mirror image, and have exactly the same functions and inverters. Another binary example is provided in FIG. 53 with inverters 5300 and 5301 and its corresponding descrambler is shown in FIG. 54 with inverters 5400 and 5401.

Figure 55:
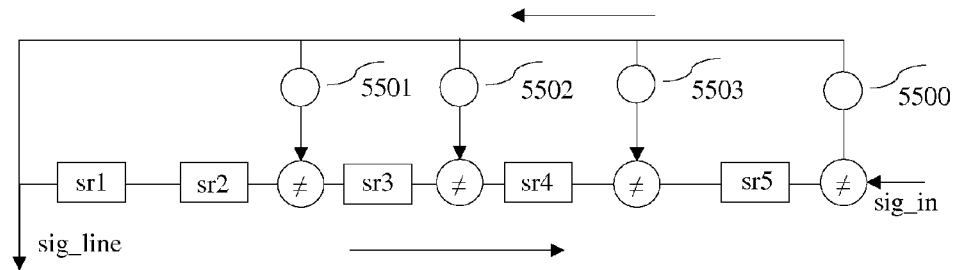
FIG. 55 is another diagram of a binary scrambler in Galois configuration in accordance with an aspect of the present invention.
Figure 56:
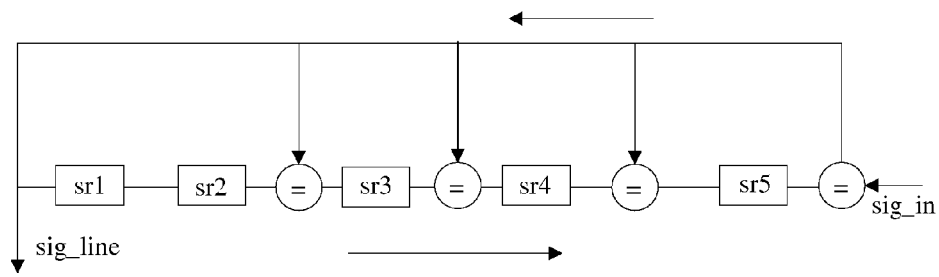
FIG. 56 is another diagram of a binary self-synchronizing descrambler in Galois configuration in accordance with an aspect of the present invention.

The use of binary inverters in binary scramblers, descramblers and sequence generators has essentially the effect of changing a XOR or mod-2 addition function into an EQUAL function. One can easily check that a XOR function with one binary inverter at the input is identical to an EQUAL function. A XOR function with a binary inverter at the output also is equivalent to an EQUAL function. A XOR function with a binary inverter at both inputs remains equivalent to a XOR function. Accordingly the use of inverters in binary scramblers, descramblers and sequence generators is equivalent to replacing some or all XOR functions by EQUAL functions. As an illustrative example the binary scrambler of FIG. 51 is provided by its equivalent circuit in FIG. 55, by 'moving' the inverter 5100 to 5500 in FIG. 55. This changes the signal provided to the XOR function between the shift register elements in FIG. 55. To correct that each tap is provided with an inverter: inverter 5501, 5502 and 5503. Based on the earlier provided explanation one can then change all the relevant XOR functions combined with inverters into EQUAL functions as shown in FIG. 56. Based on the earlier cited patent applications it should be appreciated that all multipliers in n-valued with n≧2 LFSRs and LFCSRs can be eliminated so that only 2-input functions are used.

Figure 53:
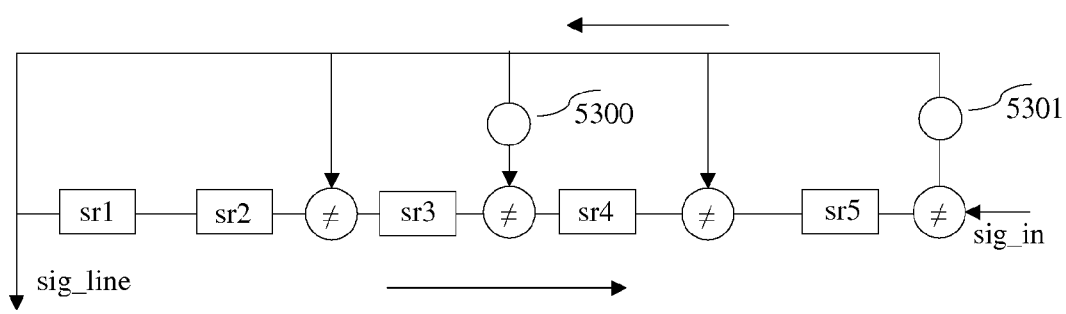
FIG. 53 is another diagram of a binary scrambler in Galois configuration in accordance with an aspect of the present invention.
Figure 54:
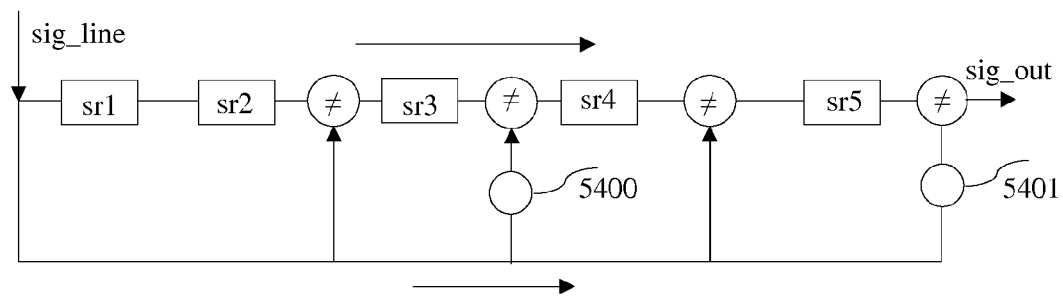
FIG. 54 is another diagram of a binary self-synchronizing descrambler in Galois configuration in accordance with an aspect of the present invention.

FIG. 53 and FIG. 54 show corresponding binary scrambler and descrambler with inverters 5300, 5301 and 5400 and 5401. These inverters can be eliminated by using EQUAL functions at the appropriate positions.

The effect of using inverters in binary sequence generators may be that the sequence will be inverted or that the sequence is shifted in phase. In both cases the absolute correlation number between such a sequence and sequences generated different inverter configurations of the generator will be the minimum number, indicating that the sequences are not in phase.

Figure 57:
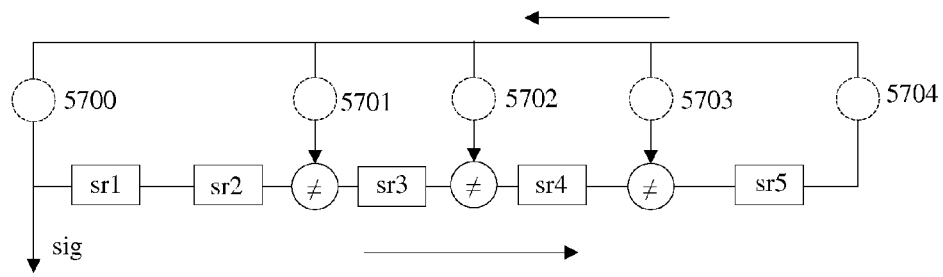
FIG. 57 is a diagram of possible binary sequence generators in Galois configuration in accordance with an aspect of the present invention.

A binary illustrative example of this method which is an aspect of the present invention is provided in a binary sequence generator as shown in FIG. 57. Herein one of the binary multipliers 5700, 5701, 5702, 5703 or 5704 is used in generating a binary m-sequence of 31 chips. Again a clock signal is assumed, though not shown. For each case the generator starts with shift register content [0 1 1 0 1]. For each generator with a different inverter the generated sequence is provided:

Inverter 5700: [0 0 0 1 1 0 0 1 0 0 1 1 1 1 1 0 1 1 1 0 0 0 1 0 1 0 1 1 0 1 0]
Inverter 5701: [1 1 1 1 0 0 1 1 0 1 1 0 0 0 0 0 1 0 0 0 1 1 1 0 1 0 1 0 0 1 0]
Inverter 5702: [1 1 0 0 0 0 0 1 0 0 0 1 1 1 0 1 0 1 0 0 1 0 1 1 1 1 0 0 1 1 0]
Inverter 5703: [1 0 1 0 0 1 0 1 1 1 1 0 0 1 1 0 1 1 0 0 0 0 0 1 0 0 0 1 1 1 0]
Inverter 5704: [0 1 1 0 1 1 0 0 0 0 0 1 0 0 0 1 1 1 0 1 0 1 0 0 1 0 1 1 1 1 0]

For instance using the sequence generated using Inverter 5700 as the baseline the sequence of Inverter 5701 is an inverted and shifted version of the sequence of Inverter 5700. The sequence of Inverter 5702 is a shifted version of the sequence of Inverter 5701; etc. One can generate additional sequence versions by using combinations of the Inverters. This method which is an aspect of the current invention applies to binary as well as to non-binary sequence generators. It provides a relatively simple method to create orthogonal sequences with minimal modifications and without changing initial shift register content.

It was shown here and elsewhere by the inventor that a combination of binary and n-valued inverters and a single 2-input (or 2-place) switching function can be reduced to an equivalent 2-input switching function. Conversely one can expand a single 2-input function into a 2-input switching function with inverters. Accordingly the scramblers, descramblers, sequence generators and detectors of the present invention that have no inverters can also be realized by equivalent circuits having functions and inverters. Accordingly scramblers, descramblers, sequence generators and detectors that have inverters and which can be reduced to equivalent scramblers, descramblers, sequence generators and detectors having no inverters and can perform in accordance with one or more aspects of the present invention are fully contemplated.

It has been demonstrated in earlier cited patent applications that multipliers can be avoided in LFSRs in Fibonacci configuration. It has been shown as an aspect of the present invention how a Fibonacci LFSR can be converted into a Galois LFSR. Accordingly it is possible to create Galois LFSRs wherein multipliers are avoided. Further more multipliers only play a role in n-valued LFSRs with n>2. For n=2 or the binary case a multiplier is either 0 or 1, which means either a connection is present or not.

In one embodiment of n-valued functions it is sometimes preferred to use adders and multipliers over GF($2^p$) or in an extended binary field. This allows implementing adders and multipliers with binary circuits. In such a case it may not be beneficial to circumvent the use of multipliers. Accordingly it has been show how to create descramblers, scramblers, sequence generators and detectors with multipliers. It should be appreciated that a self synchronizing descrambler in Galois configuration having an LFCSR and having an appropriate descrambling function so that identical 2 inputs always provide an output in a first state, will serve as a self synchronizing detector for a sequence of n-valued symbols generated by an n-valued sequence generator with an LFSR with the same structure (taps, functions and shift register) as the LFCSR.

In conclusion: the general rules and configurations are provided for converting a Fibonacci structure LFSR into a Galois configuration; also a rule for converting a Galois configuration into a Fibonacci configuration was provided; furthermore a method was provided for determining the content of the shift register of a Galois configuration and a detector for detecting n-valued sequences. Also a descrambler in Galois configuration used in Fibonacci mode was provided and a Galois scrambler and corresponding self-synchronizing Galois descrambler was provided for binary and n-valued signals. The LFSR based scrambler and descrambler of which at least one is in Galois configuration may be part of a system of scrambling/descrambling wherein scrambler and descrambler are positioned in different apparatus and/or locations. The descrambler may have a LFCSR instead of an LFSR. Also a sequence generator and a sequence detector, wherein the sequence generator has an LFSR may be part of a system. The detector may be considered a descrambler with a non-reversible descrambling function, wherein the output of the descrambling function provides important information about a detected sequence.

The scrambling/descrambling system or generating detecting system may be part of a communication system, a data storage system or any other system for coding, or transmitting, or storing, or receiving, or retrieving, or decoding or any other system for processing data. The system may be a wired or a wireless system. A data storage system may be a system using an optical disk, or an electro-optical disk. It may also use a magnetic medium. Symbols may be represented as optical, electronic or any other valid representation that can be processed, including magnetic. The n-valued symbols may be represented as signals having physical properties of for example different amplitude, phase, modulation, polarization or any other quantifiable physical property. Switching tables may be realized in electronic, optical, electro-optical, electromechanical, quantum mechanical or any other way that can implement an n-valued truth table. A symbol may also be represented by a series of lower valued symbols such as binary symbols. Switching and storage of symbols then take effect on the series of symbols, often called words.

The steps of the methods which are provided as aspects of the present invention may be implemented in a processor, such a processor may be a general purpose processor or for instance a digital signal processor. These processors may process n-valued symbols as words of binary symbols. They may use A/D and D/A converters to change n-valued symbols in words of lower valued symbols and to convert words of lower valued symbols into n-valued symbols. In case an n-valued symbol is represented as a word of lower valued symbol a storage element of a shift register is assumed to be able all elements of a word representing an n-valued symbol. The n-valued symbols may also be processed by dedicated or custom made switching and storage components.

Figure 48:
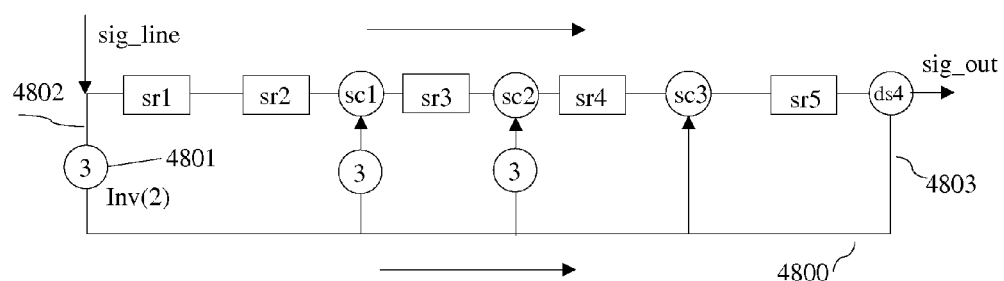
FIG. 48 is a diagram of a self-synchronizing descrambler in Galois configuration in accordance with an aspect of the present invention.

A novel concept that was introduced is the Linear Forward Connected Shift Register or LFCSR. In a scrambler in Galois configuration such as FIG. 47 an LFSR is used. Herein the movement of symbols from input to output of the scrambler through the shift register is different from the direction of movement through the loop 4700 in FIG. 47. In a descrambler in Galois configuration such as shown in FIG. 48 all movement from symbols either through the shift register or through loop 4800 has the same direction. Accordingly the descrambler of FIG. 48 has an LFCSR. The structure of the LFSR of the Galois scrambler and the LFCSR of the corresponding LFSR are identical. This is intended as: the shift registers are identical with taps and functions in the same positions. Inverters, if included, occur in the same positions in LFSR and LFCSR. As explained in certain cases an inverter in an LFSCR connected to the input of the shift register of a scrambler may be the reverse of an inverter connected to the output of the LFSR of the corresponding scrambler.

It should be clear that the descrambler in Galois configuration with an LFCSR reverses the direction of movement of symbols as compared to the LFSR of the corresponding scrambler. Accordingly the input of the descrambler corresponds with the position of the output of the scrambler. The input of the scrambler (or an input of the scrambling function) corresponds with the output of the descrambler (or the output of the descrambling function). The output of the scrambling function of the scrambler corresponds with an input of the descrambling function in the descrambler.

It is here repeated that anywhere and anytime an LFSR or an LFCSR is used a clock signal to initiate the shift of content into an element of a shift register is assumed. If the LFSR or LFCSR is implemented in a processor such clock signal is implied by executing an instruction. Elements of a shift register that can hold a binary or n-valued symbol or a binary word representing an n-valued symbol may be realized as for instance latches or Flip-Flops. N-valued memory elements are enabled and disclosed in U.S. Pat. No. 6,133,754 by Olson, issued on Oct. 19, 2000 entitled Multiple-valued logic circuit architecture; supplementary symmetrical logic circuit structure (SUS-LOC). N-valued latches and memory elements are also disclosed by the inventor in U.S. patent application Ser. No. 11/139,835 filed May 27, 2005 entitled Multi-valued digital information retaining elements and memory devices which is incorporated herein by reference in its entirety. Scramblers, descramblers, sequence generators and sequence detectors, substantially in n-valued form with n>2 were disclosed by the inventor in earlier cited patent applications and in U.S. patent application Ser. No. 11/042,645, filed on Jan. 25, 2005 entitled Multi-valued scrambling and descrambling of digital data on optical disks and other storage media which is incorporated herein by reference in its entirety.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A scrambler for scrambling a sequence of n-valued symbols with $n \geq 2$, each n-valued symbol able to assume one of n states, into a sequence of scrambled n-valued symbols, comprising:

an n-valued Linear Feedback Shift Register (LFSR) in Galois configuration, the n-valued LFSR having an n-valued shift register that includes a plurality of n-valued data storage elements and a first device implementing an n-valued reversible logic function having a first input and an output connected between two directly neighboring n-valued register elements of the plurality of n-valued data storage elements;

a second device implementing an n-valued scrambling function with a first input of the second device being connected to an output of the shift register, a second input of the second device able to receive the sequence of n-valued symbols, and an output of the second device being connected to an input of the n-valued shift register and to a second input of the first device; and a scrambler output not being an output of the second device that provides the sequence of scrambled n-valued symbols.

2. The scrambler as claimed in claim 1, wherein $n \geq 3$.

3. The scrambler as claimed in claim 1, wherein the scrambler output is connected to the input of the n-valued shift register.

4. The scrambler as claimed in claim 1, further comprising an n-valued inverter with an input and an output; the n-valued inverter being connected between an input of the n-valued shift register and the output of the second device.

5. The scrambler as claimed in claim 1, further comprising an n-valued inverter with an input and an output, the output of the n-valued inverter connected to the second input of the first device and the input of the n-valued inverter being connected to the output of the second device.

6. The scrambler as claimed in claim 1, wherein the n-valued scrambling function is an adder over GF(n).

7. A descrambler for descrambling a sequence of n-valued symbols with $n \geq 2$ into a sequence of descrambled n-valued symbols, comprising:

an n-valued Linear Forward Connected Shift Register (LFCSR) in Galois configuration, the n-valued LFCSR having an n-valued shift register that includes a plurality of n-valued data storage elements and a first device implementing an n-valued reversible logic function having a first input and an output connected between two neighboring storage elements of the plurality of n-valued data storage elements and a second input connected to an input of the n-valued shift register;

a second device implementing an n-valued descrambling function with a first input of the second device being connected to an output of the n-valued shift register, a second input of the second device connected to the input of the n-valued shift register and an output of the second device providing the sequence of descrambled n-valued symbols; and the input of the n-valued shift register enabled to receive the sequence of n-valued symbols.

8. The descrambler as claimed in claim 7, wherein $n \geq 3$.

9. The descrambler as claimed in claim 7, further comprising:

an n-valued inverter with an input and an output; the n-valued inverter being connected between the input of the n-valued shift register and the second input of the second device.

10. The descrambler as claimed in claim 7, further comprising:

an n-valued inverter with an input and an output; the n-valued inverter being connected between the input of the n-valued shift register and the second input of the first device.

11. The descrambler as claimed in claim 7, wherein the LFCSR of the descrambler has a structure equivalent to a structure of an LFSR of a corresponding scrambler.

12. The descrambler as claimed in claim 7, wherein the descrambler is part of a communication system.

13. The descrambler as claimed in claim 12, wherein the communication system is a wireless communication system.

14. The descrambler as claimed in claim 12, wherein the communication system further comprises a scrambler in Galois configuration corresponding to the descrambler.

15. The descrambler as claimed in claim 7, wherein the descrambler is part of a data storage system.

16. The descrambler as claimed in claim 15, wherein the data storage system uses an optical disk.

17. The descrambler as claimed in claim 7, further comprising an n-valued switching function which is an adder over $GF(n)$.

18. A method for scrambling a sequence of at least k with k>2 n-valued symbols, an n-valued symbol enabled to assume one of n states with $n \geq 2$, comprising:
   processing the sequence of at least k n-valued symbols with an n-valued Linear Feedback Shift Register (LFSR) in Galois configuration, the n-valued LFSR having an n-valued shift register with p<k n-valued data storage elements and a first device implementing an n-valued reversible logic function having a first input and an output connected between two directly neighboring n-valued register elements of the p n-valued data storage elements;
   applying a second device implementing an n-valued scrambling function with a first input of the second device being connected to an output of the shift register, a second input of the second device able to receive the sequence of at least k n-valued symbols, and an output of the second device being connected to an input of the n-valued shift register and to a second input of the first device;
   inputting the sequence of at least k n-valued symbols on the second input of the second device; and
   outputting on an output not being an output of the second device a scrambled sequence of at least k n-valued symbols, the scrambled sequence of at least k n-valued symbols having the same number of symbols as the sequence of at least k n-valued symbols.

19. The method as claimed in claim 18, wherein a connection is made through an n-valued reversible inverter.

20. A method for self-synchronizing descrambling of a sequence of at least k with k>2 n-valued symbols with $n \geq 2$, an n-valued symbol able to assume one of n states, comprising:
   processing the sequence of at least k n-valued symbols by an n-valued Linear Forward Connected Shift Register (LFCSR) in Galois configuration, the n-valued LFCSR having an n-valued shift register of p with p<k n-valued data storage elements and a first device implementing an n-valued reversible logic function having a first input and an output connected between two neighboring storage elements of the p n-valued data storage elements and a second input connected to an input of the n-valued shift register;
   applying a second device implementing an n-valued descrambling function with a first input of the second device being connected to an output of the n-valued shift register, a second input of the second device connected to the input of the n-valued shift register and an output of the second device enabled for providing the sequence of descrambled n-valued symbols;
   inputting on the input of the n-valued shift register the sequence of at least k n-valued symbols; and
   outputting on the output of the second device a descrambled sequence of n-valued symbols, the descrambled sequence having the same number of n-valued symbols as the sequence of at least k n-valued symbols.

21. The method as claimed in claim 20, wherein an n-valued reversible inverter is applied to make a connection between an output and an input.

* * * * *